July 30, 1968 J. A. GITHENS 3,395,393

INFORMATION STORAGE SYSTEM

Filed Sept. 14, 1965 9 Sheets-Sheet 1

INVENTOR
J. A. GITHENS
BY M I Rackman
ATTORNEY

July 30, 1968 J. A. GITHENS 3,395,393

INFORMATION STORAGE SYSTEM

Filed Sept. 14, 1965 9 Sheets-Sheet 2

July 30, 1968 J. A. GITHENS 3,395,393

INFORMATION STORAGE SYSTEM

Filed Sept. 14, 1965 9 Sheets-Sheet 3

July 30, 1968 J. A. GITHENS 3,395,393

INFORMATION STORAGE SYSTEM

Filed Sept. 14, 1965 9 Sheets-Sheet 4

July 30, 1968 J. A. GITHENS 3,395,393

INFORMATION STORAGE SYSTEM

Filed Sept. 14, 1965 9 Sheets-Sheet 6

July 30, 1968 J. A. GITHENS 3,395,393

INFORMATION STORAGE SYSTEM

Filed Sept. 14, 1965 9 Sheets-Sheet 8

United States Patent Office 3,395,393

Patented July 30, 1968

3,395,393

INFORMATION STORAGE SYSTEM

John A. Githens, Morris Township, Morris County, N.J., assignor to Bell Telephone Laboratories, Incorporated, New York, N.Y., a corporation of New York Filed Sept. 14, 1965, Ser. No. 487,179
30 Claims. (Cl. 340—172.5)

ABSTRACT OF THE DISCLOSURE

An associative memory comprising numerically-oriented storage cells is disclosed. Each storage cell in the memory includes two comparison circuits and associated logic for generating various functions which may be used directly in performing numerical operations. Each cell, except the end cell, is connected to two adjacent cells in such a manner that the functions generated in a cell may control operations in the same or the two adjacent cells.

This invention relates to associative memory systems, and more particularly to such systems in which logical operations may be performed on the stored data.

Most memory units in present day use are of the direct access type. Each memory location is identified by a respective address, and data is written into or read out of a particular location by specifying the respective address. In an associative memory, however, each memory location is not provided with a respective address. Instead, each location includes information and retrieval data. Often the two types of data are indistinguishable and the length of each type is variable. To operate on any given cell or memory location retrieval information may be applied to all cells simultaneously. A particular cell may be identified if its stored retrieval data matches the applied retrieval information. If necessary, the information data stored in the cell may be read out once the cell is identified. Similarly, if information data is to be written into a cell, the data may be applied to all cells but the only cell in which the information data is written may be that in which a match of the applied retrieval information and the stored retrieval data takes place.

In the copending application of B. A. Crane et al., Ser. No. 395,161, filed Sept. 9, 1964, an improved cell for an associative memory is described. Each cell includes logic circuitry and is equipped to perform logical operations on the data stored in it. Since in an associative memory operations may be performed simultaneously in many cells, the Crane et al. cell has powerful bulk processing properties.

In the above-identified copending Crane et al. application, as well as in the continuation-in-part application Ser. No. 465,088, filed June 18, 1965, a two-dimensional (X and Y) array of memory cells is also shown. The primary advantage of the two-dimensional array is that it affords even more powerful bulk data processing properties. A particular example described in the above-identified parent application is matrix multiplication. In the two-dimensional associative memory two matrices may be multiplied in only a fraction of the time require to do the same thing on even the fastest and most sophisticated of present-day computers.

The individual cells disclosed in both of the above-identified applications are non-numerically oriented. While it is true that numerical operations may be performed in the various associative memories, the individual cells are better suited for performing non-numerical operations such as string manipulation and list processing. A rather lengthy sequence of instructions must be executed in order, for example, to carry out an addition operation.

It is a general object of this invention to provide associative memory cells which are numerically oriented. These cells, because they include logic circuitry which perform logical functions required in numerical operations, enable numerical operations to be executed more rapidly and with fewer instructions than heretofore possible.

In both one-dimensional and two-dimensional associative memory arrays utilizing the cells or my invention numerical operations can be executed very rapidly. Almost all such operations, e.g., addition, may be performed with the execution of at most three instructions. The difference between the cells of my invention and those of Crane et al. are mainly in the functions formed in the cells, the logic circuits included in the two types of cells being different. The functions formed in the cells of my invention are those which may be used directly in numerical operations. In the Crane et al. cells these functions can be derived only in piecewise fashion. The various functions are formed, stored in the cells, and then used in subsequent steps until the desired operation is completed. In the cells of my invention, however, because the functions formed by the logic circuitry in each cell are those required in most numerical operations, the outputs of the logic circuits may be used directly in the cells to derive the final results without necessitating the execution of a lengthy sequence of instruction.

Further objects, features and advantages of my invention will become apparent upon consideration of the following detailed description in conjunction with the drawing, in which.

Figure 1:
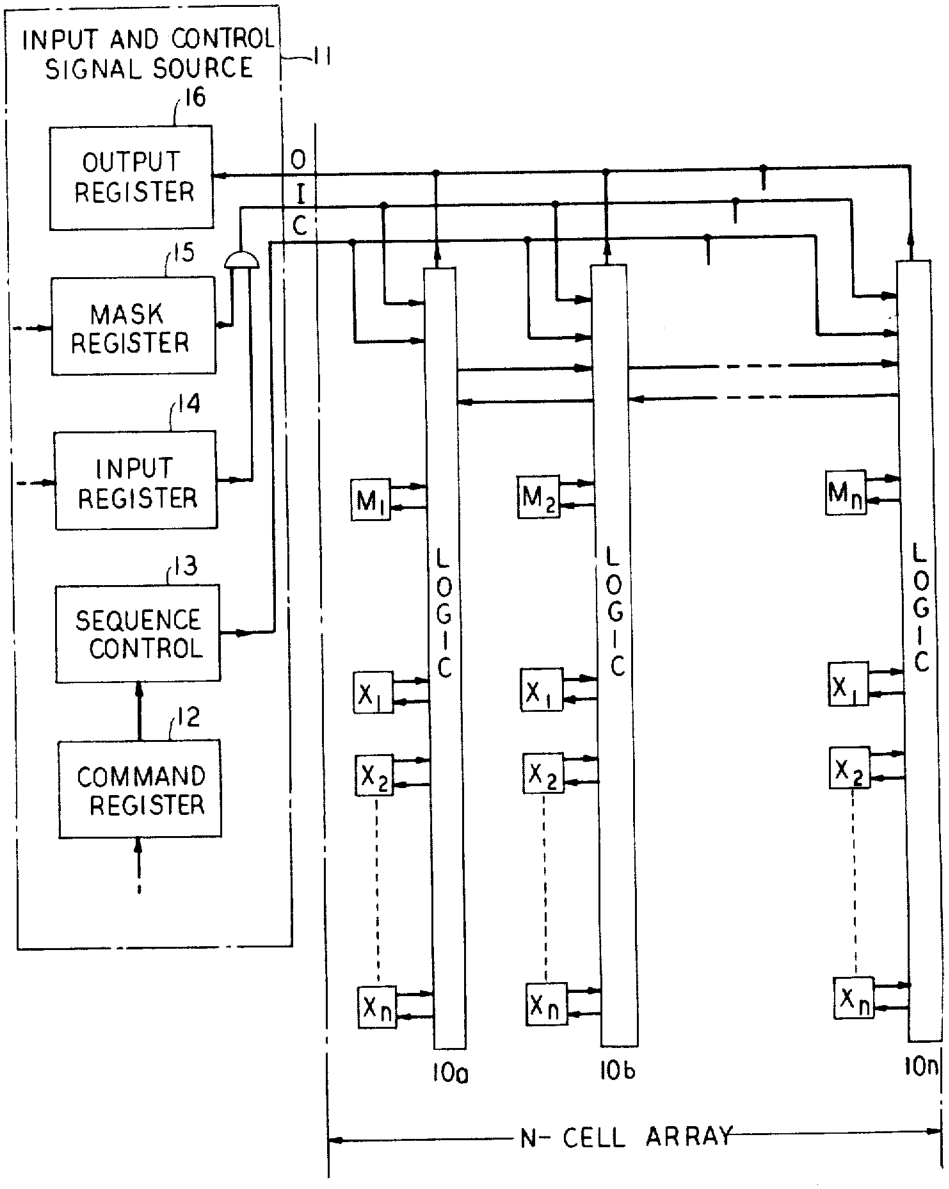
FIG. 1 is the same as FIG. 1 in the above-identified Crane et al. parent application and is a simplified block diagram representation of a one-dimensional associative memory.
Figure 2:
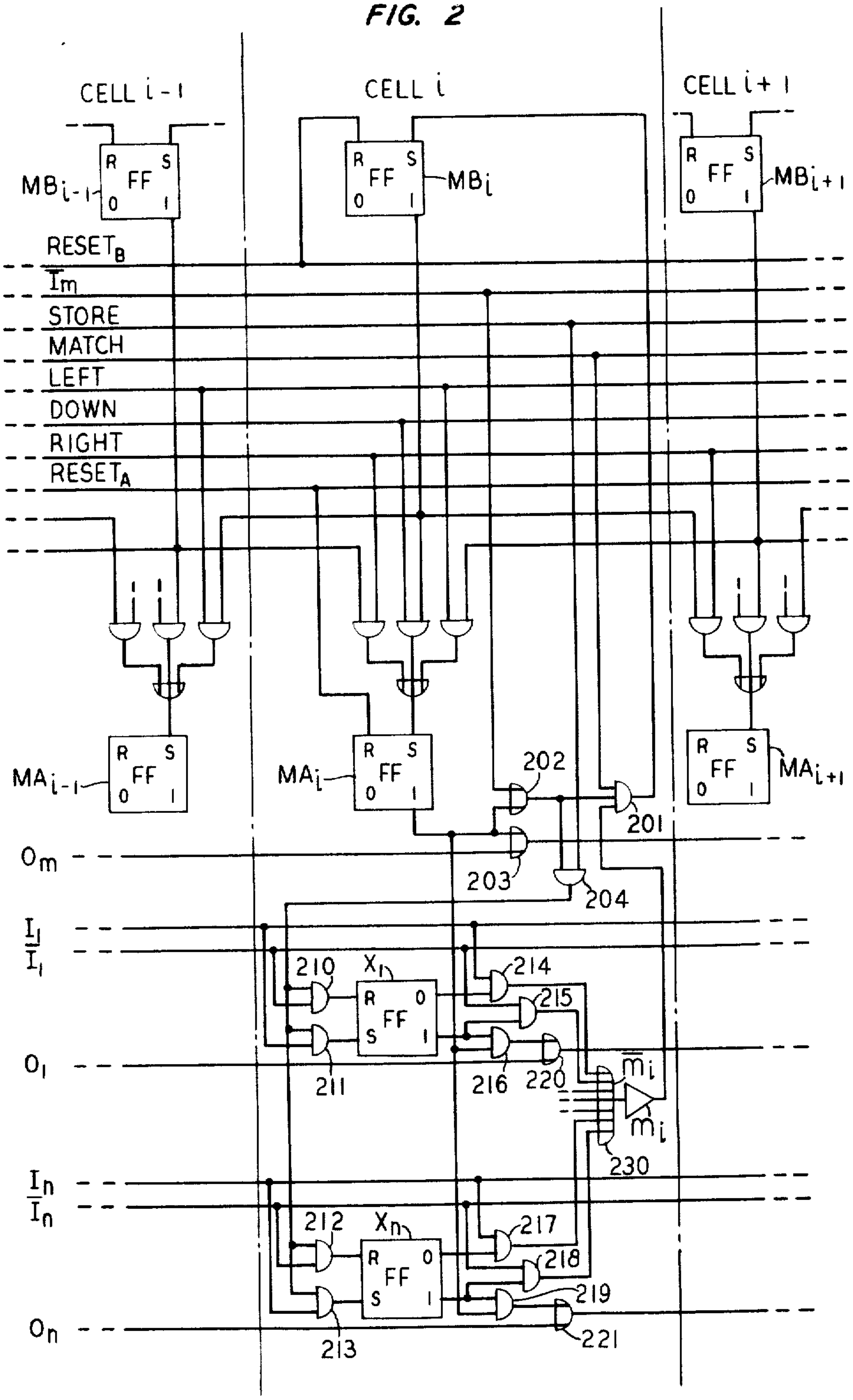
FIG. 2 is the same as FIG. 2 in the above-identified Crane et al parent application and is a schematic representation of one cell in the memory of FIG. 1.
Figure 3:
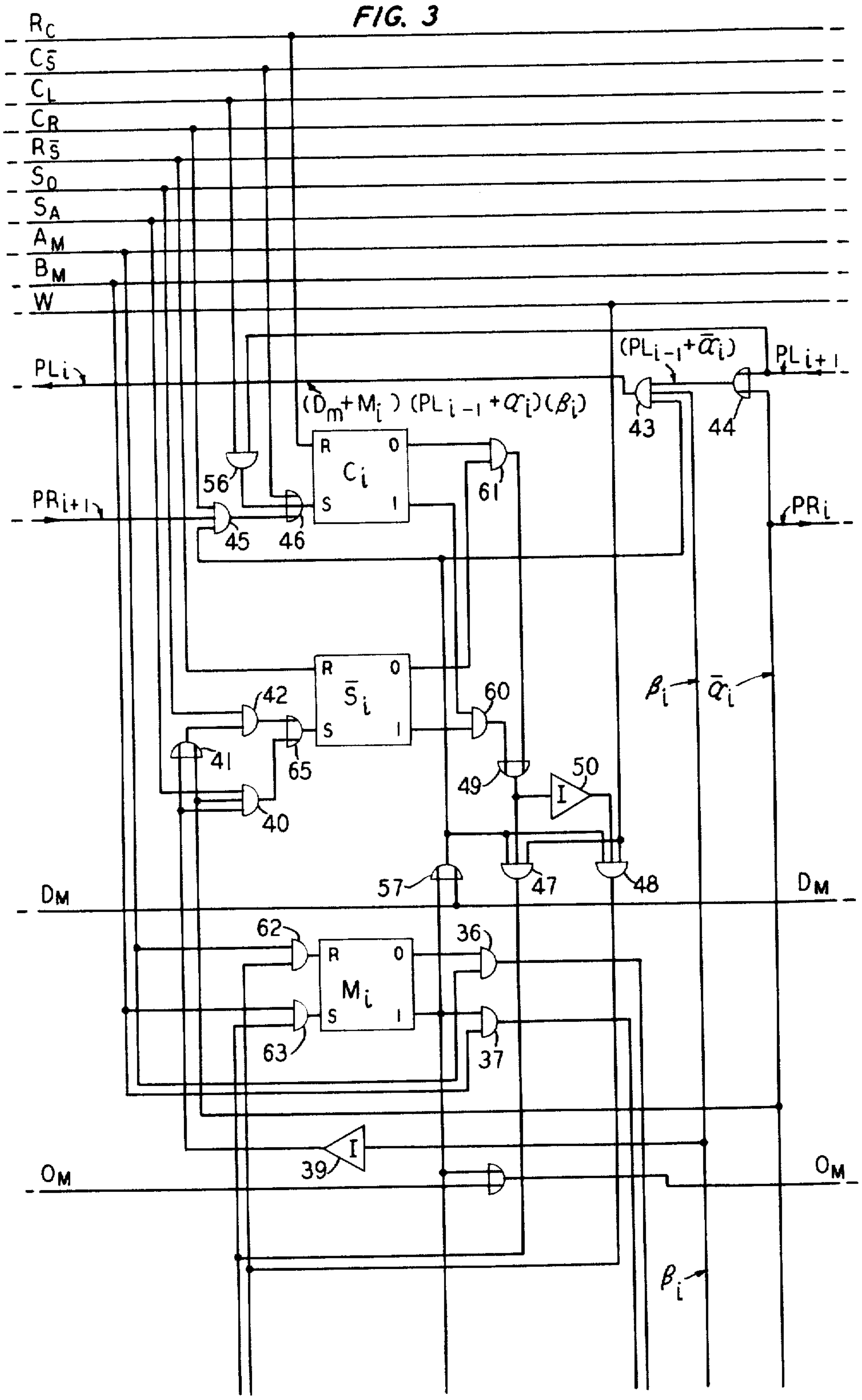
Figure 4:
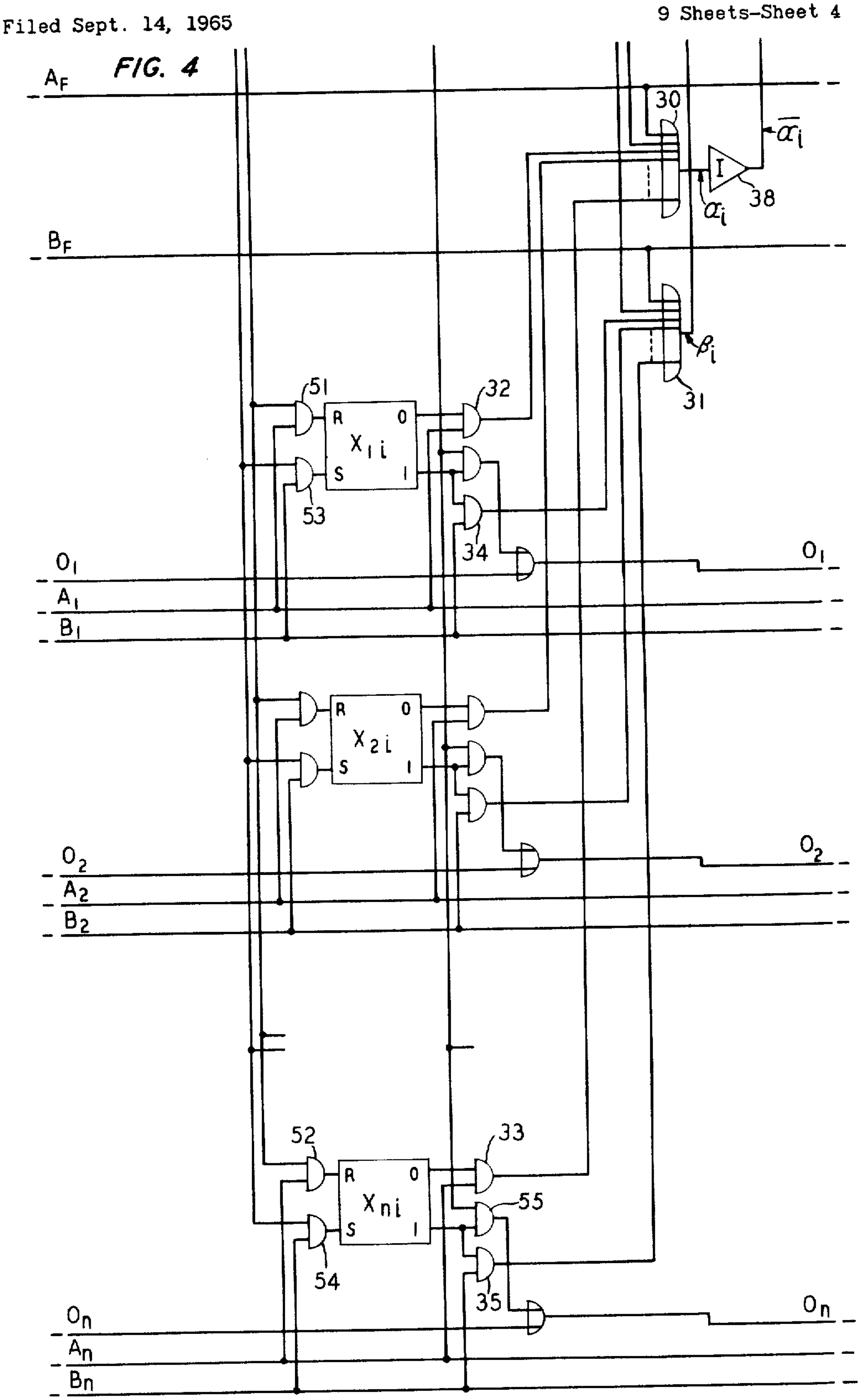
Figure 5:
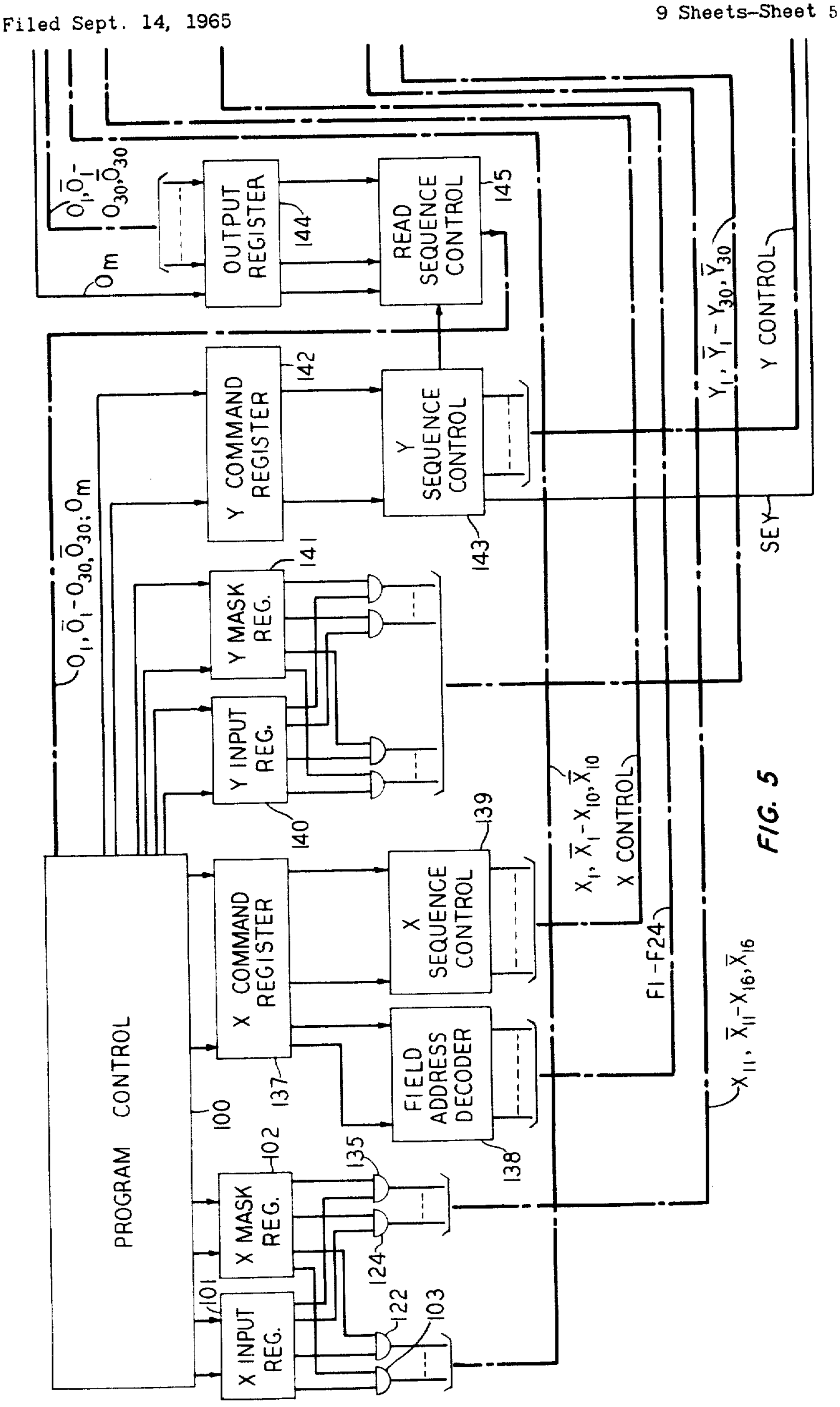
Figure 6:
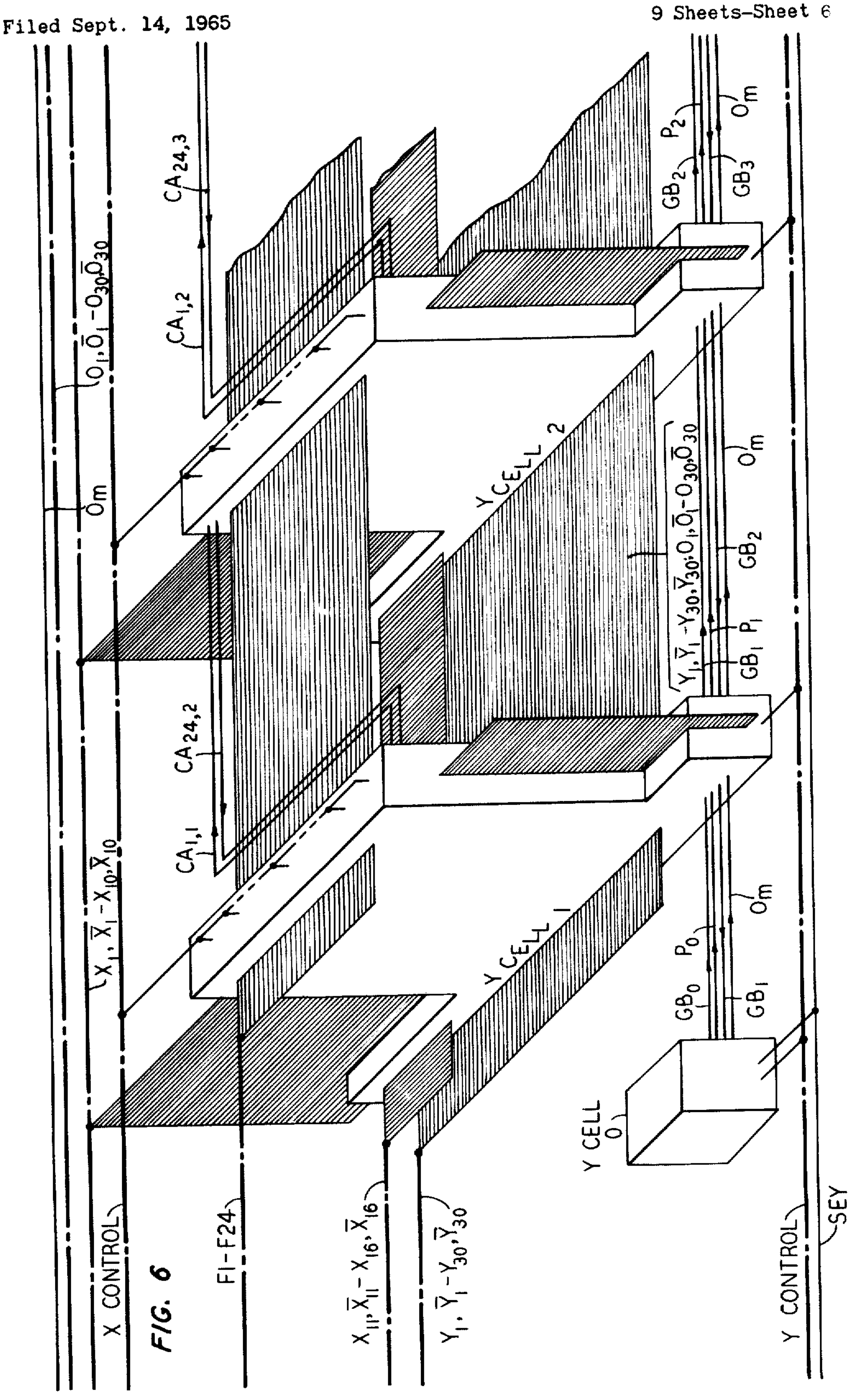
Figure 7:
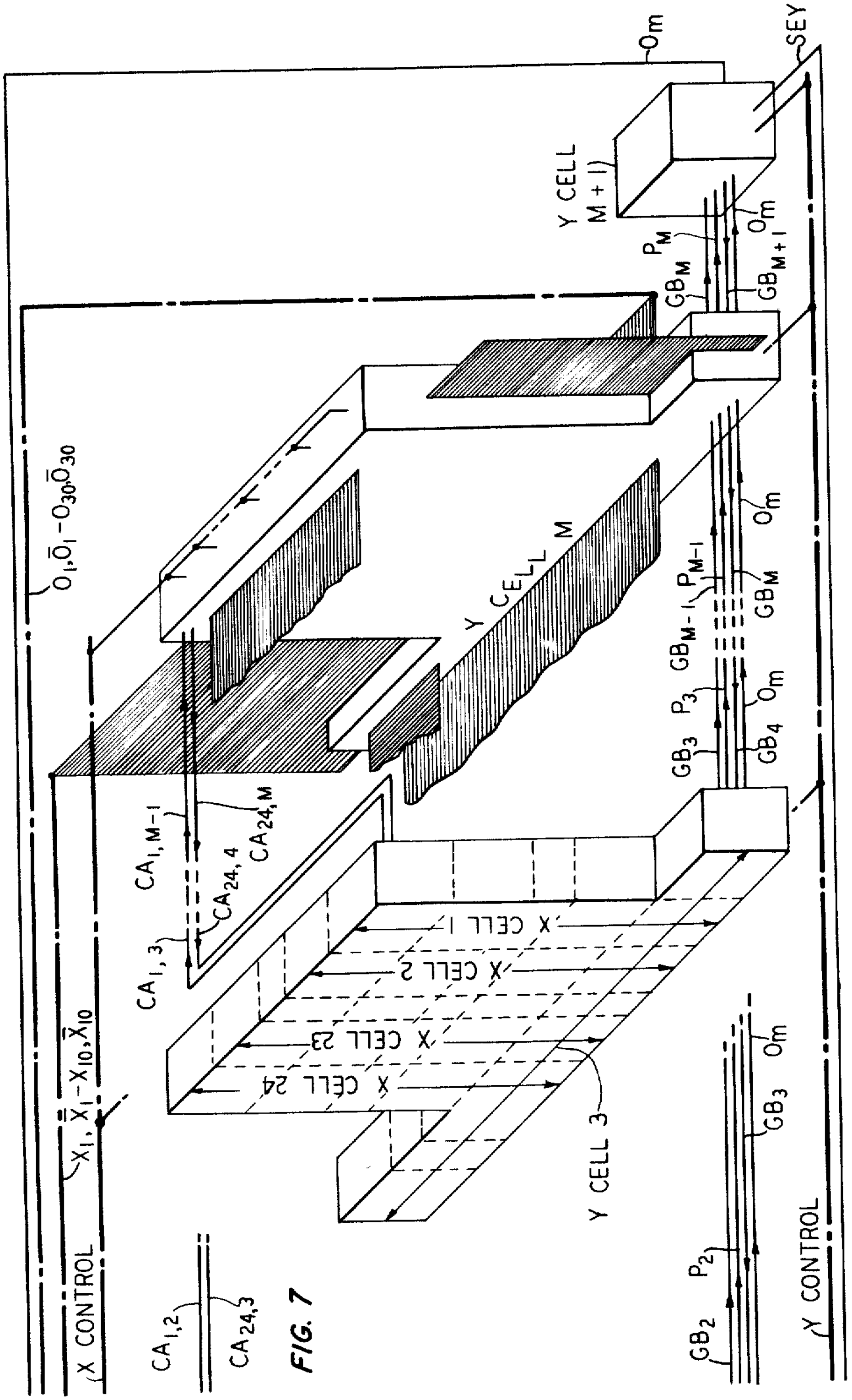
Figure 8:
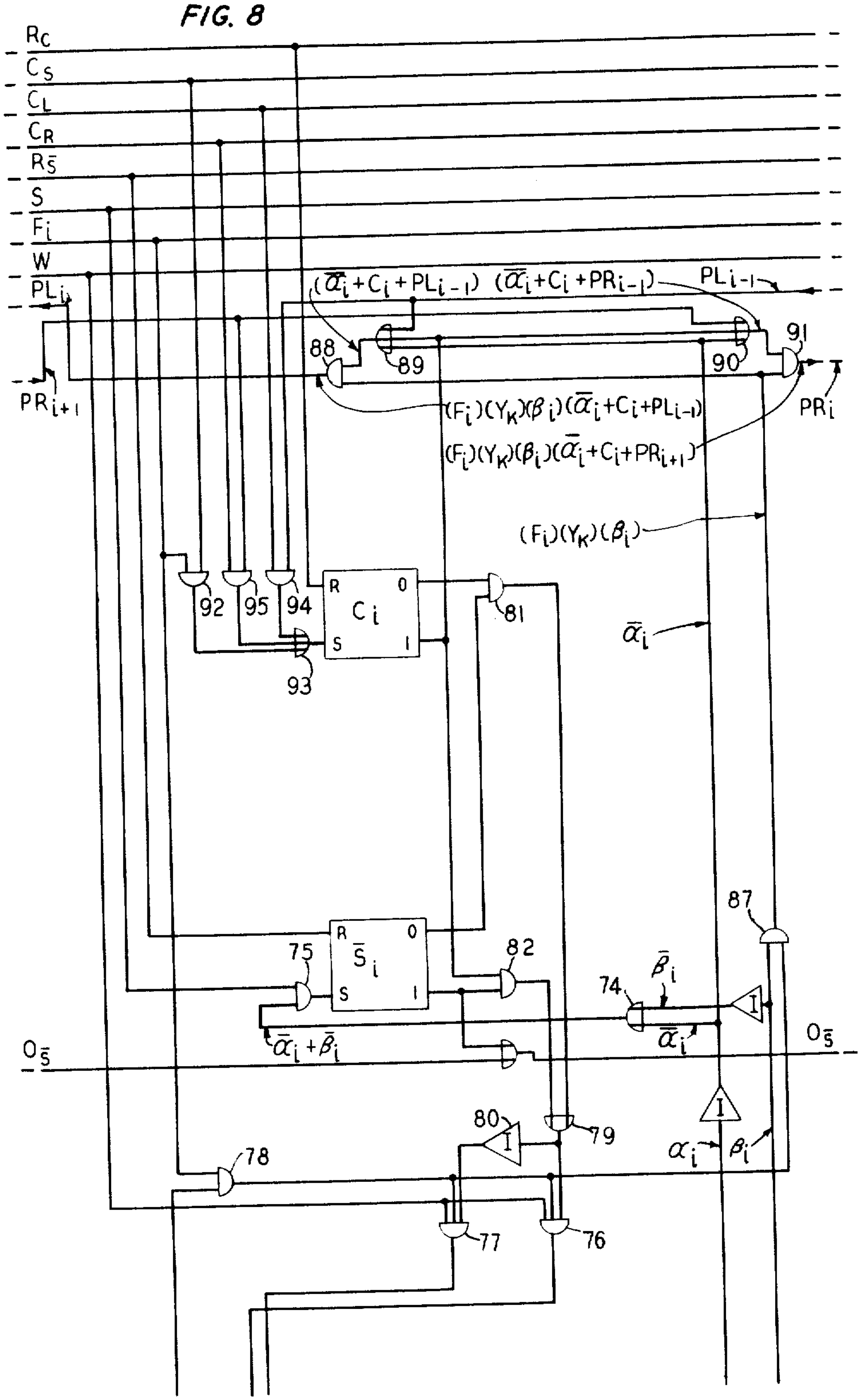
Figure 9:
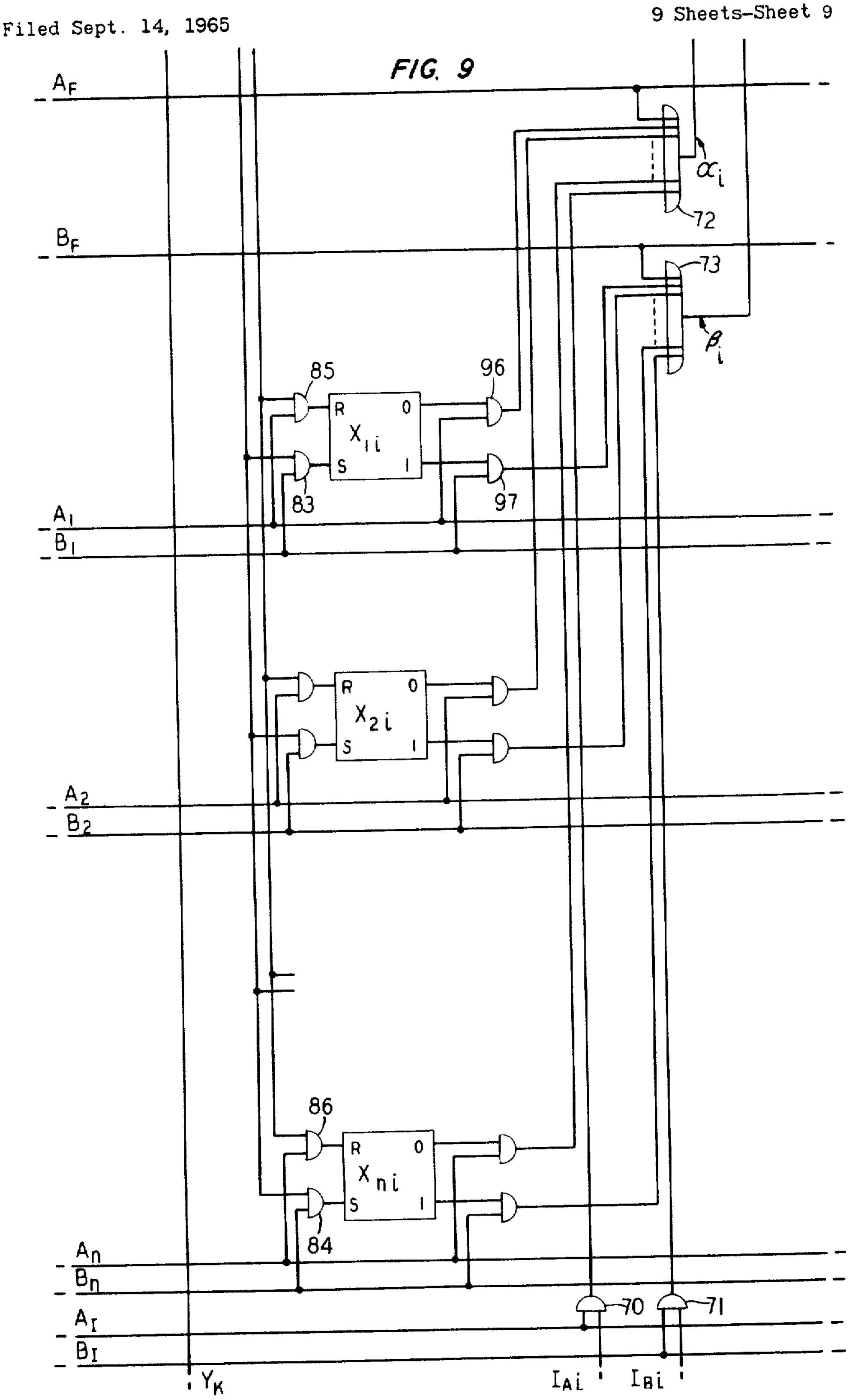

FIGS. 3 and 4, with FIG. 3 placed on top of FIG. 4, are a schematic representation of one illustrative cell in accordance with the principles of my invention;

FIGS. 5–7 are the same as FIGS. 1–3 in the Crane et al. continuation-in-part application, with the figures being placed from left to right, and are a symbolic perspective representation of a two-dimensional associative memory; and FIGS. 8 and 9, with FIG. 8 placed on top of FIG. 9, are a schematic representation of another illustrative cell in accordance with the principles of my invention, which may be used most advantageously in a two-dimensional array.

INDEX

| | Col. No. |
|---|---|
| (I) Prior one-dimensional associative memory ---- | 2 |
| (A) Description of system ---- | 2 |
| (B) Details of individual cell ---- | 4 |
| (C) Exemplary operational sequences ---- | 5 |
| (II) Prior two-dimensional associative memory ---- | 8 |
| (III) Illustrative cell for use in a one-dimensional memory ---- | 9 |
| (A) Details of individual cell ---- | 9 |
| (B) Exemplary operational sequence ---- | 14 |
| (IV) Illustrative cell for use in a two-dimensional memory ---- | 16 |
| (A) Details of individual cell ---- | 16 |
| (B) Exemplary operational sequences ---- | 19 |

(I) PRIOR ONE-DIMENSIONAL ASSOCIATIVE MEMORY

(A) *Description of system*

My invention may be best understood by first examining the organization of, and the details of a particular cell in, the Crane et al system. FIG. 1 shows a one-dimensional arrangement of identical cells in an associative memory in which operations are performed in parallel on cells under common control. Each identical cell 10*a*, 10*b*, . . ., 10*n* is essentially an *n*-bit storage register combined with logic circuits for controlling operations on the register's contents, all cells being connected in parallel to a set of data input and command leads. The arrangement is a series network of interconnected cells, with each cell connected to the succeeding and preceding cells in the network chain.

Each cell contains identical circuitry for facilitating storage, matching, propagation and retrieval operations; viz, *n* data registers $X_1$, $X_2$ . . . $X_n$; a match circuit M and control logic. Signals from an input and control signal source 11 are supplied to each cell over various leads designating the particular operation to be performed; whereupon, the content of each cell is either altered to store new data, compared with matching data, or retrieved. The cells are joined by propagate leads and, upon receipt of proper directives, propagate control signals in either direction to activate adjacent cells, thereby placing them in condition for a possible match of their content with the next applied signal.

Thus the array responds to three basic types of commands, MATCH, STORE, and READ, as directed by the input and control signal source 11 which comprises signal generation and timing circuitry well known in the art. A command to be executed is held in the command register 12 until it is translated into control signals by the sequence control 13. These signals, in turn, drive the control logic in all cells simultaneously via the common control lines C.

The MATCH command finds all cells, the contents of which match the content of the input register 14, and marks those cells by setting their match circuits M. A cell so marked may then be placed in an "active" condition. Every cell, the content of which does not match that of the input register, may have its match circuit reset. This command is implemented by supplying the content of the input register 14 to all cells simultaneously via the input lines I. Each cell's logic then determines whether the pattern of inputs matches its content and either sets or resets the respective match circuit.

The MATCH command, therefore, provides a simultaneous search of all cells. The mask register 15 can be used to mask out bit positions of the input register 14. This enables searching a subset of data registers in every cell while disregarding the remaining data registers. For example, all bit positions of the input register 14 except those corresponding to $X_2$ and $X_3$ can be masked out, resulting in all cells in which the contents of the $X_2$ and $X_3$ registers agree with those bit positions having a successful match regardless of the contents of the other data registers.

The cell logic is such that the MATCH command can specify cell activity in its comparison pattern as well. This makes it possible to search only active cells, thereby finding a subset within a subset of cells. For example, all active cells not containing $X_2=0$, $X_3=1$ can be deactivated.

The cell logic also enables a directional MATCH command where a cell matching the comparison specification is not activated, but its nearest left or right neighbor is. Therefore, including cell activity in the comparison specification of a directional MATCH command enables a cell to transfer its activity to either of its two nearest neighbors.

In the STORE command, the content of the input register 14 is supplied to all cells simultaneously via the input lines I. The cell logic is designed to respond to two types of STORE commands, conditional and unconditional. With the conditional STORE command only active cells are involved and the contents of inactive cells are not disturbed. With the unconditional STORE command all cells store the input data, regardless of activity status. As in the MATCH command, the mask register 15 can be used to specify "don't cares" in any of the bit positions. Masking out a bit position in the input register 14 avoids disturbing the content of the corresponding data register in each cell.

The READ command retrieves the content of an active cell and places it in the output register 16 via the output lines O. Since all cells share common output lines, it is necessary to ensure that only one cell is active before reading. Otherwise the output register 16 will contain the logical OR of the contents of all active cells, and the content of any one cell will be indistinguishable. A single active cell can be isolated through the use of MATCH commands.

(B) *Details of Individual cell*

FIG. 2 shows the logical organization of an *n*-bit cell in the Crane et al. system of FIG. 1. Each cell includes *n* flip-flops $X_1$ through $X_n$. The eight control lines, 2*n* input lines, and $n+1$ output lines are common to all cells. Cell *i* is shown in detail, and cells $i-1$ and $i+1$ are shown partially in order to indicate how cell activity can be transferred from one cell to another. The match flip-flop M is double-ranked to form match flip-flops $MA_i$ and $MB_i$, thereby eliminating the possibility of race conditions in the directional MATCH commands. Flip-flop $MA_i$ represents cell activity ("1" for active, "0" for inactive), and flip-flop $MB_i$ serves as temporary storage for the result of a MATCH command. The result of a successful match ($MB_i=1$) is used to set one of the three MA flip-flops ($MA_{i-1}$, $MA_i$ and $MA_{i+1}$) connected to $MB_i$. Which MA flip-flop is set depends on which of the three control lines, LEFT, DOWN, or RIGHT, is pulsed. The LEFT and RIGHT lines are used in directional MATCH commands.

In MATCH commands the comparison of the contents of a cell's data flip-flops, $X_1, \ldots, X_n$, with the signals on the input lines, $I_1, \bar{I}_1, \ldots, \bar{I}_n$, is performed by AND gates such as 214, 215, 217, and 218. These 2*n* AND gates connect to OR gate 230 so that a mismatch in one or more of the data flip-flops produces a signal $\bar{m}_i=1$. Not caring about the content of a data flip-flop is accomplished by not pulsing either of its input lines. Signal $m_i$, the inversion of $\bar{m}_i$, is therefore "1" only when no mismatches occur, and is an input to AND gate 201 to the right of the $MA_i$ flip-flop in FIG. 2. Another input to AND gate 201 is through OR gate 202, the inputs of which are the $MA_i$ flip-flop and the $\bar{I}_m$ control line. This arrangement allows specifying cell activity in the matching pattern. Not caring about cell activity is accomplished by pulsing the $I_m$ control line. Pulsing the MATCH control line, the third input to AND gate 201 sets the $MB_i$ flip-flop if a successful match has occurred.

In STORE commands AND gates 210, 211, . . . 212, and 213 to the left of the data flip-flops $X_1$ through $X_n$ control the transfer of signals on the input lines to the data flip-flops. In the conditional STORE command a signal on the STORE control line is gated by the $MA_i$ flip-flop via OR gate 202 and AND gate 204, causing only active cells to store the input data. In the unconditional STORE command the $I_m$ control line is also pulsed, causing both active and inactive cells to store the input data. In both types of STORE commands those data flip-flops whose contents are to remain undisturbed do not have signals on either of their input lines.

When a cell is active, each of its set data flip-flops puts an output signal on its respective output line which it shares with corresponding data flip-flops in all other cells through the corresponding OR gates such as 220 and 221 in FIG. 2. The cells need not receive any control signals; therefore, to respond to a READ command, it is sufficient to inspect the $n+1$ output lines coming out of the array. The necessity for having only one active cell when reading out the contents of data flip-flops is evident. An input pattern must accompany the MATCH and STORE commands in order to specify which cell flip-flops are to be operated upon; an input pattern need not accompany a READ command. The additional output conductor $O_m$ is provided to enable the control to determine if at least one cell is active.

The PROPAGATE command can be viewed as an extended directional MATCH command by which an already active cell can propagate its activity through "strings" of adjoining cells whose contents match the input pattern specified with the command. It says, in effect: "Activate all cells between an already active cell and the first cell to its left (right) that does not match the input pattern." It is accomplished by the following sequence of commands:

$RESET_B$
$MATCH \cdot (I_i = \text{don't care})$
$MATCH \cdot LEFT\ (RIGHT) \cdot (I_i)$
$RESET_A$
DOWN After all of the MB flip-flops are reset the first set of input signals, ($I_i$=don't care), causes the signal $m_i=1$ to appear at the output of OR gate 230 in all cells; but since $\bar{I}_m$ is not pulsed, the $MB_i$ flip-flop of only already active cells is set to "1." The second set of input signals ($I_i$) then causes only those cells whose contents match the inputs to have $m_i=1$. Therefore, simultaneous application of the MATCH and LEFT (RIGHT) control signals causes the activity condition to be stored in the $MB_i$ flip-flop of an originally active cell followed by those cells whose contents match the input pattern. At the end of the third step all cells in the chain are active, and all cells except the leftmost (rightmost), the one with the mismatch, have their MB flip-flops set. The $RESET_A$ command resets all of the MA flip-flops and the DOWN command controls the setting of all the MA flip-flops in the chain except the last, as desired. An equally useful PROPAGATE command can be formed by applying $RESET_A$ and LEFT (RIGHT) as the final control signals. This causes the string of active cells to be displaced one cell to the left (right).

(C) *Exemplary operational sequences*

The data processing capabilities of the Crane et al. associative memory may be best understood by considering a particular example. Assume that *n*-bit words are stored in *n* consecutive cells, with one bit in each word being stored in a different cell. That is, an entire word is not stored in one cell. Instead, referring to FIG. 1, each word is stored horizontally. For example, the $X_8$ flip-flops in a sequence of cells may be used for storing one word and the $X_9$ flip-flops in the same cells may be used for storing a second word. Certain flip-flops in each cell might be reserved for control purposes. Thus flip-flops $X_1$, $X_2$ and $X_3$ might be used for control purposes in each cell while the other flip-flops in each cell are used for storing data bits, each flip-flop representing a bit in a different word. Although the input and control signals are applied to all cells the operation can be performed only in selected cells. For example, a 1 might be stored in the $X_1$ flip-flop in the sequence of cells whose data words are to be operated upon, i.e., a 1 in an $X_1$ flip-flop marks the respective cell as containing bits of words to be operated upon.

The reason for storing data words in this manner is that one match flip-flop is available to each bit of a word. This allows searching all bits of a word simultaneously, and when two words are stored side-by-side in this manner, their corresponding bits can be simultaneously searched. As will be seen, this enables arithmetic operations to be performed on any number of such pairs, where each pair is in a different set of cells, on a parallel-by-word, parallel-by-bit basis.

A simple addition operation serves to illustrate how a linear array of cells can be used to perform an arithmetic operation on many sets of data simultaneously. The addition example is given here for two reasons. First, it illustrates the bulk data processing capabilities of the Crane et al. system. Second, it will enable the advantages of the numerally oriented cell of my invention to be appreciated; a rather lengthy sequence of instructions is required to perform an addition operation in the non-numerically oriented cell of the Crane et al. system and, as will be apparent below, a much shorter sequence may be used in an associative memory which includes my numerically oriented cells. Suppose in each group the data word storage in data flip-flops $X_8$ is to be added to the word in data flip-flops $X_9$. Assume these words to be binary numbers with their least significant bits to the right. The addition is to be performed on all groups of data whose cells are marked by having $X_1=1$. This marking could be the result of a previous sequence of operations which used the associative properties of the array to identify those data groups which are to take part in this addition operation.

A sequence of commands, a program, for performing the addition is given below. Associated with each command is an input pattern which specifies the bit positions which enter into the operation and their values. Bit positions not specified ("don't cares") do not enter into the operation. Following the program is a description of what each command does. Assume that bit position $X_2$, which is used for temporary storage, is cleared to the zero state:

CLEAR MATCH LEFT ($X_1=1$, $X_8=0$, $X_9=0$)

Activate the next cell to the left of each cell containing a matching pattern and deactivate all other cells. This is accomplished by the following four orders in sequence: $RESET_B$; MATCH $\cdot$ $\bar{I}_M$; $RESET_A$; LEFT.

STORE CONDITIONALLY ($X_2=1$)

Store the input pattern in all active cells.

CLEAR MATCH LEFT ($X_1=1$, $X_8=1$, $X_9=1$)
PROPAGATE LEFT ($X_1=1$, $X_2=0$)

Activate all cells between an already active cell and the first cell to its left that does not match the input pattern.

STORE UNCONDITIONALLY ($X_2=0$)

Store the input pattern in all cells.

STORE CONDITIONALLY ($X_2=1$)

Store the input pattern in all active cells.

CLEAR MATCH ($X_1=1$, $X_2=0$, $X_8=0$, $X_9=1$)

Activate all cells containing the input pattern and deactivate all others.

MATCH ($X_1=1$, $X_2=0$, $X_8=1$, $X_9=0$)

Activate all cells containing the input pattern.

MATCH ($X_1=1$, $X_2=1$, $X_8=0$, $X_9=0$)
MATCH ($X_1=1$, $X_2=1$, $X_8=1$, $X_9=1$)

The approach in this addition program is to first generate the carry input to each digit position (cell) and, then, using associative techniques, to determine the sum digits. The carry inputs are generated in the first four operations by locating the addend-augend pairs of "1,1" and "0,0." They can be considered "carry generators" and "carry inhibitors," respectively. Carries are then propagated, starting with carry generators, until the carry propagation is annihilated by a carry inhibitor.

Thus, the first operation, CLEAR MATCH LEFT, searches the array for those cells in the marked groups ($X_1=1$) that store carry inhibitors ($X_8=0$, $X_9=0$). This results in the match flip-flops being set in the cells to the left of those cells whose contents match the input pattern. The result in each of these cells is temporarily stored in position $X_2$ by the second operation, STORE CONDITIONALLY, to free the match flip-flops for use in the next operation. The third operation, again a CLEAR MATCH LEFT, searches for the carry generators and activates the cells to their left.

At this point the match flip-flops store the start of the carry chains (the carry generators mapped into carry input terms by the MATCH LEFT command), and these carry chains should activate cells to their left until carry inhibitors are encountered. This is accomplished by the fourth operation, PROPAGATE LEFT. Note the input pattern specified for this operation, ($X_1=1$, $X_2=0$). This means that starting at any match flip-flop in the set condition ($MB=1$) the cells to its left will be activated in sequence as long as they belong to the marked set ($X_1$—1) and they do not store a carry inhibition ($X_2=0$). In this manner, carry propagation is accomplished. The result is that the match flip-flop is set in all cells in which the the carry input is "1."

In the fifth and sixth operations, STORE UNCONDITIONALLY and STORE CONDITIONALLY, position $X_2$ is cleared and the carry input is stored, freeing the match flip-flops for other uses. The sum digits can now be determined. The following fourth match operations search the marked groups for those addend, augend, and carry input combinations that produce sum digits of "1." The four input patterns correspond to the four entries that produce sum digits of "1" in an addition truth table. Thus, the four match operations build up in the match flip-flops the union of sets corresponding to the desired sum. This completes the addition operation, leaving the sums stored in the match flip-flops. The result can then be used as desired; it might, for example, be stored in one of the bit positions.

It is important to note what has been accomplished in performing this operation. The addition was performed on two components of all members of the designated set of data groups. This set could be quite large; it could, in fact, include all of the stored data groups. Thus, the associative memory provides the capability for parallel-by-bit, parallel-by-word operations. The duration of these operations is logically independent of the number of members in the sets being processed. The performance of these operations with moderate speed on a fairly large number of data group sets permits the effective addition speed to exceed that of today's fastest computers.

The ability to do bulk addition is interesting; but to be truly useful, the associative memory must have the capability to perform other arithmetic and logical operations. It should be clear that bulk subtraction can be performed in the same manner as above. In fact, the sequence of commands is exactly the same for subtraction; only the patterns for the first and third operations need be changed (to $X_1=1$, $X_8=1$, $X_9=0$ and $X_1=1$, $X_8=0$, $X_9=1$, respectively) to realize the difference $X_8-X_9$.

Shifting of variables is easily accomplished. The sequence,

CLEAR MATCH ($X_1=1$, $X_j=1$)
STORE CONDITIONALLY ($X_j=0$)
CLEAR MATCH LEFT (RIGHT)
STORE CONDITIONALLY ($X_j=1$)

shifts the quantity $X_j$, in the subset marked by $X_1=1$, one place to the left (right). The first command comprises the four orders: $RESET_B$; $MATCH\cdot\bar{I}_m$; $RESET_A$; DOWN. The only cells made active are those which are marked ($X_1=1$) and have $X_j=1$. In the second step a 0 is written in the $X_j$ flip-flop of each of these active cells. In the third step the MB flip-flop in each active cell is set, all cells are then deactivated, and finally the activity conditions are propagated to adjacent cells: $RESET_B$; MATCH; $RESET_A$; LEFT (RIGHT). In the fourth step a 1 is written in the $X_j$ flip-flop in each active cell.

Thus, the Crane et al. associative memory has the capability of parallel-by-bit, parallel-by-word addition, subtraction, and shifting. It is well established that given these abilities, any arithmetic operations can be performed.

(II) PRIOR TWO-DIMENSIONAL ASSOCIATIVE MEMORY

FIGS. 5, 6 and 7 show, in block diagram form, the two-dimensional Crane et al. system. This system is described in detail in the above-identified continuation-in-part application. Referring to FIG. 7 the organization of a particular Y cell and the associated group of X cells is shown. Twenty-four X cells are connected to each Y cell. Each X cell has two control flip-flops CA and CB which are equivalent to the MA and MB flip-flops of FIG. 2. Each X cell also includes ten data storage flip-flops. The first nine are designated X1 through X9. The tenth flip-flop is designated a Y flip-flop. The tenth data flip-flop in X cell 1 is designated Y1, the tenth data flip-flop in X cell 2 is designated Y2, etc. The 24 data flip-flops Y1 through Y24 are shared by respective X cells and the Y cell. Each Y cell is similar to an X cell but includes 30 data flip-flops. The first 24 of these are flip-flops Y1 through Y24, those shared with respective X cells. The remaining six data flip-flops Y25 through Y30 in each Y cell are unique to the Y cell. In addition to 30 data flip-flops each Y cell includes two control flip-flops GA and GB, which control flip-flops are similar to the CA and CB flip-flops in an X cell.

There are two types of interactions between each Y cell and the 24 associated X cells. The first type of interaction arises from the fact that the 24 flip-flops Y1 through Y24 may be used for MATCH and STORE operations in either the X dimension or the Y dimension. That is, these flip-flops may be specified in MATCH and STORE commands for the X cells and in MATCH and STORE commands for the Y cells. It is these 24 flip-flops which enable data to be transferred back and forth between a Y cell and the associated 24 X cells. The second type of interaction arises from the fact that the X cell commands may specify a Y cell condition and Y cell commands may specify X cell conditions. For example, a Y cell command may specify that the operation is to be performed only in a Y cell where at least one of the 24 associated X cells is active. Similarly, an X cell command may specify that the operation is to be performed only in X cells whose associated Y cell is either active or contains particular data in flip-flops Y25 through Y30.

Within any group of 24 X cells signals are extended from each cell to the cells on both the left and the right (as shown in the one-dimensional array of FIG. 2). In addition, signals may be extended between the first X cell in one group and the 24th X cell in adjacent group. Thus, for example, signals $CA_{1,1}$ and $CA_{24,2}$ allow operations in the first X cell associated with Y cell 1 and the 24th X cell associated with Y cell 2 to be dependent upon the operation of the other cell. Control signals are also extended in either direction between adjacent Y cells. The control signals between Y cells 1 and 2 are $GB_1$, $GB_2$ and $P_1$. Data is not read out of the X cells and instead is read out of only the Y cells. Thus output conductors are associated only with Y cells. An $O_m$ conductor equivalent to that shown on FIG. 2 is connected to the Y cells rather than the X cells since data is read out of the Y cells rather than the X cells.

Command signals are derived from the control circuitry of FIG. 5 and the various output signals are returned to this equipment. The X control cable is coupled to every X cell in the array. The signals on the conductors in this cable, extended in parallel to all X cells, control X cell operations. The F control conductors F1 through F24 are connected to respective X cells. Thus, for example, conductor F18 is connected to the 18th X cell in each group of 24 X cells. The X control conductors are connected in an identical manner to each of the 24 X cells in a group and signals on these conductors do not allow operations to be performed in particular X cells in any group. Signals on the F conductors identify particular F cells in each group. For example, signals on conductors F1 and F2 identify X cells 1 and 2 in each group and enable operations to be performed in only these two cells in each group if necessary.

The X data inputs are applied to the 20 conductors $X_1$, $\overline{X}_1$ through $X_{10}$, $\overline{X}_{10}$. Conductors $X_1$ and $\overline{X}_1$, for example, are extended to the $X_1$ flip-flop in every X cell in the array. Similar remarks apply to the other 18 X data inputs. Conductors $X_{10}$ and $\overline{X}_{10}$ are connected to flip-flops Y1 through Y24 in each Y cell. It is to be recalled that flip-flops Y1 through Y24 are specified as the tenth data flip-flops in the respective X cells when operations are being performed in the X cells. Consequently a pair of X data input conductors is provided for these flip-flops.

The Y control cable includes the conductors over which control signals are transmitted in parallel to all of the Y cells. Conductor SEY is also a Y control conductor but is extended to only the two end Y cells 0 and $M+1$. The system includes 20 X data inputs which are connected in pairs to the ten respective data flip-flops in each X cell. In a similar manner 60 Y data inputs, $Y_1$, $\overline{Y}_1$ through $Y_{30}$, $\overline{Y}_{30}$ are provided, two for each of the same numbered data flip-flops in all of the Y cells. Conductors $Y_1$ and $\overline{Y}_1$, for example, are coupled to flip-flop $Y_1$ in each of the Y cells, and signals on this pair of conductors control the writing and comparing operations in the M Y1 flip-flops. It is to be noted that 24 of the 30 data flip-flops in each Y cell may be written into in accordance with signals on the conductor pair $X_{10}$, $\overline{X}_{10}$ and in accordance with signals on a respective one of the Y, $\overline{Y}$ pairs.

In the two-dimensional array data is not read out of flip-flops X1 through X9 in the X cells. Data may be read out of only flip-flops Y1 through Y30 in each Y cell. The readout is parallel in that any one of the 30 0 conductors is high in potential if the respective flip-flop in any one of the cells selected for readout is in the 1 state, and the corresponding $\overline{O}$ conductor is high in potential if any one of the same flip-flops is in the 0 state. As seen in FIGS. 6 and 7 the 60 output conductors originate in Y cell 1, go through all Y cells, and leave Y cell M for connection to the control unit. In addition to the 30 pairs of output conductors the system also includes output conductor $O_m$. This conductor, extended back to the control unit, is high in potential if the GB flip-flop in any of the Y cells is in the 1 state.

(III) ILLUSTRATIVE CELL FOR USE IN A ONE-DIMENSIONAL MEMORY

(A) *Details of individual cell*

FIG. 2 depicts a cell which may be used in a one-dimensional array such as that shown in FIG. 1. While the Crane et al. cell of FIG. 2 is non-numerically oriented the cell of FIGS. 3 and 4 is numerically oriented. Many of the cells of the type shown in FIGS. 3 and 4 are included in a memory controlled by a circuit similar to that shown in FIG. 1. Although slightly different control signals are required their derivations will be apparent to those skilled in the art. Various logical functions are formed in the cell during the course of executing instructions in order that numerical operations be performed with the execution of a minimum number of instructions. The basic difference between the cells of FIG. 2 and FIGS. 3 and 4 is that in the non-numerically oriented cell a single MATCH circuit is provided, while in the numerically oriented cell two MATCH circuits are included.

In order to appreciate the difference the MATCH circuit in the Crane et al. cell must be examined in detail. Each data flip-flop has 0 and 1 outputs. The 1 output is high in potential and the 0 output is low in potential if the flip-flop is in the 1 state, and the 0 output is high in potential and the 1 output is low in potential if the flip-flop is in the 0 state. Consider flip-flop $X_1$ on FIG. 2. The two input conductors (which are used for both writing and matching purposes although only the matching operation is being considered at the present) extended to the X1 flip-flop in each X cell are $I_1$ and $\overline{I}_1$. In the input pattern for any MATCH command either one of these conductors may alone be high in potential, or both may be low. If both are low in potential, a "don't-care" condition, neither of gates 214 and 215 operates and consequently the output of gate 230 is not affected by the state of flip-flop X1. If $I_1$ is high in potential and $\overline{I}_1$ is low in potential, representing a 1 input pattern, gate 214 operates if flip-flop X1 is in the 0 state, i.e., the state of the flip-flop does not match the input bit. If $\overline{I}_1$ is high in potential and $I_1$ is low in potential, a 0 input pattern, gate 215 operates only if the flip-flop is in the 1 state. In each of the latter two cases the output of OR gate 230 is high as a result of the bit contained in flip-flop X1 only if the bit in the flip-flop does not match the input bit. A similar connection is provided from the outputs of the other flip-flops in the cell to the inputs of OR gate 230. In a typical matching operation the bits contained in some of the data flip-flops will be of no concern. Neither of the respective two input conductors is pulsed and consequently neither of the output gates such as 214 and 215 or 217 and 218 associated with each of these flip-flops operates. The only output gates which do operate are those associated with flip-flops which do not match the respective input bits. Consequently the single output of gate 230 is high only if at least one of the flip-flops of concern contains a bit whose value is opposite to that of the respective input bit in the matching pattern. The output of gate 230 is low only if all of the flip-flops of concern contain bits which match the respective bits in the input pattern. The output of OR gate 230 feeds into an inverter. Consequently, the $m_1$ signal is high only if the flip-flops of concern contain bits which match the input pattern. If at least one of these bits does not match the respective input bit the $m_1$ (match) signal is low.

Referring to FIGS. 3 and 4 the *i*th cell includes three control flip-flops $C_i$, $\overline{S}_i$ and $M_i$, and *n* data flip-flops $X_{1i}$ through $X_{ni}$. The cell includes two match circuits, one of these including OR gate 30 and the other including OR gate 31. The 0 output of each of the data flip-flops is connected to a gate such as 32 or 33. A respective A conductor is connected to the other input of each of these gates and the outputs of all of these gates are connected to inputs of OR gate 30. The 1 output of each flip-flop is connected to a respective gate such as 34 or 35. Respective B inputs are connected to the other inputs of these gates and the outputs of all of these gates are connected to inputs of OR gate 31. It should be noted that the input conductor pairs such as $A_1$, $B_1$ no longer have complementary designations. In the Crane et al. system each pair of input signals represents a 1, a 0, or a "don't-care." In the latter case neither of the conductors in a pair such as $I_1$, $\overline{I}_1$ is pulsed. In the case of a 1 conductor $I_1$ is pulsed alone and in the case of a 0 conductor $\overline{I}_1$ is pulsed alone. The two complementary designations are used because whenever the bit in the first flip-flop in each cell is of concern opposite bit signals are applied to conductors $I_1$, $\overline{I}_1$. There are at most three signal patterns which may appear on conductors $I_1$, $\overline{I}_1$. In a system utilizing the cell of FIGS. 3 and 4 the fourth combination, where both input conductors are pulsed, may also be used. For this reason, the two input conductors in each pair no longer bear complementary designations, and the A, B notation is used instead. The A conductor in each pair is associated with the 0 output of the respective flip-flop in each cell and the B conductor in each pair is associated with the 1 output of the respective flip-flop in each cell.

Consider the four possible input combinations. If the bit in flip-flop $X_{1i}$ is of no concern on "don't-care" condition exists. Neither of conductors $A_1$ and $B_1$ is pulsed, neither of gates 32 and 34 operates, and the output of neither of OR gates 30 and 31 is affected by the bit in flip-flop $X_{1i}$. If conductor $A_1$ is pulsed alone (an input 1 bit) gate 34 cannot operate and gate 32 operates only if flip-flop $X_{1i}$ is in the 0 state. Consequently the operation of gate 31 is not affected by the bit in flip-flop $X_{1i}$ and the output of gate 30 is high in potential as a result of the bit contained in flip-flop $X_{1i}$ only if this bit is a 0. Similarly, if conductor $B_1$ is pulsed alone (an input 0 bit) gate 32 cannot operate and the output of OR gate 30 is unaffected by the value of the bit in flip-flop $X_{1i}$. Gate 34 can operate but does so only if flip-flop $X_{1i}$ is in the 1 state. The fourth input pattern is where both of conductors $A_1$ and $D_1$ are pulsed. In such a case both of gates 32 and 34 are enabled. Since the other inputs of each of these gates are connected to different ones of the 0 and 1 outputs of flip-flop $X_{1i}$, only one of the gates may operate. Consequently the output of one of gates 30 and 31 is not affected by the bit contained in flip-flop $X_{1i}$, and the output of the other of the OR gates is high in potential.

Each of OR gates 30 and 31 has one input controlled by the bit contained in a respective one of the *n* data flip-flops. In addition to *n* such inputs, gate 30 includes an $A_F$ input and gate 31 includes a $B_F$ input. If either of these two conductors is energized by the control circuitry the output of the respective OR gate is high. OR gate 30 is provided with still another input from gate 36 and OR gate 31 is provided with an additional input from gate 37. If neither of control conductors $A_M$ and $B_M$ is pulsed neither of these gates operates and the operations of OR gates 30 and 31 are not affected. On the other hand, if conductor $A_M$ is pulsed and flip-flop $M_i$ is in the 0 state gate 36 operates and the output of OR gate 30 is high; and if conductor $B_M$ is pulsed and flip-flop $M_i$ is in the 1 state gate 37 operates and the output of OR gate 31 is high.

The output of OR gate 30, represented by the symbol $\alpha_i$, which is a 1 if the output of the gate is high, is de- is determined by the function $$\alpha_i=\overline{X}_{1i}A_1+\overline{X}_{2i}A_2+\ \ldots\ +\overline{X}_{ni}A_n+A_F+\overline{M}_iA_M$$

where $X_{2i}$ for example is a 1 only if the bit in flip-flop $X_{2i}$ is a 1, and $M_i$ is a 1 only if the bit in flip-flop $M_i$ is a 1. The output of OR gate 31, $\beta_i$, is represented by the function $$\beta_i=X_{1i}B_1+X_{2i}B_2+\ \ldots\ +X_{ni}B_n+B_F+M_iB_M$$

These two functions are the intermediate functions which control the various logical operations in the cell. Each of these functions ininverted by one of inverters 38 and 39, and the two inverted signals are applied to respective inputs of both of gates 40 and 41. The third input of gate 40 is control signal $S_A$, but neglecting this input, consider the function formed by ANDing the signals $\alpha_i$ and $\alpha_i$ in gate 40:

$$\begin{aligned}\overline{\alpha}_i\overline{\beta}_i=&\ \overline{(\overline{X}_{1i}A_1+\overline{X}_{2i}A_2+\ \ldots\ +\overline{X}_nA_n+A_F+\overline{M}_iA_M)}\cdot\\&\ \overline{(X_{1i}B_1+X_{2i}B_2+\ \ldots\ +X_{ni}B_n+B_F+M_iB_M)}\\=&\ \overline{[(\overline{X}_{1i}A_1+\overline{X}_{2i}A_2+\ \ldots\ +\overline{X}_{ni}A_n+A_F+\overline{M}_iA_M)+}\\&\ \overline{(X_{1i}B_1+X_{2i}B_2+\ \ldots\ +X_{ni}B_n+B_F+M_iB_M)]}\\=&\ \overline{(\overline{m}_i+A_F+B_F+\overline{M}_iA_M+M_iB_M)}\end{aligned}$$

The last expression should be examined. If none of conductors $A_F$, $B_F$, $A_M$ and $B_M$ is pulsed the output reduces to $m_i$, where $m_i$ is the signal derived from the single match circuit of FIG. 2. Thus the function $\overline{\alpha}_i\ \overline{\beta}_i$ derived by gate 40 (if control conductor $S_A$ is pulsed) is the same as the match output derived in the Crane et al. cell. The availability of this signal enables an array utilizing the cell of FIGS. 3 and 4 to accomplish the operations accomplished in the Crane et al. arrays.

Because the individual signals $\alpha_i$ and $\beta_i$ are derived in the cell other intermediate useful signals may be produced. The signals $\overline{\alpha}_i$ and $\overline{\beta}_i$ are directed to inputs of OR gate 41. The output of this gate is represented by the following function:

$$\begin{aligned}\overline{\alpha}_i+\overline{\beta}_i=&\ \overline{(\overline{X}_{1i}A_1\overline{X}_{2i}A_2+\ \ldots\ \overline{X}_{ni}A_n+A_F+\overline{M}_iA_M)}\\&\ \overline{+(X_{1j}B_1+X_{2i}B_2+\ldots+X_{ni}B_n+B_F+M_iB_M)}\\&\ \overline{(\overline{X}_{1i}A_1)(\overline{X}_{2i}A_2)\ldots(\overline{X}_{ni}A_n)(A_F)(\overline{M}_iA_M)}\\&\ \overline{+(X_{1i}B_1)(X_{2i}B_2)\ldots(X_{ni}B_n)(B_F)(M_iB_M)}\end{aligned}$$

As an example of the utility of this circuit consider the case where, utilizing the fourth input state, $$A_j=A_k=B_j=B_k=1$$

all other data bit positions are "don't-cares" with the respective A and B signals both being 0's, and conductors $A_F$, $B_F$, $A_M$ and $B_M$ are not pulsed. The output of OR gate 41 reduces to $X_jX_k+\overline{X}_j\overline{X}_k$, the complement of the ring sum of bits $X_j$ and $X_k$ contained in the respective flip-flops of the cell. The output of OR gate 41 is connected to one input of gate 42, the other input of which is connected to control conductor $S_0$. If gate 42 operates flip-flop $\overline{S}_i$ is set in the 1 state. This property of the circuit is very useful in addition operations. The ring sum of any two bits is a 1 only if only one of the bits is a 1. If both bits are 0's or both are 1's the ring sum is a 0. Each stage of a typical binary adder has three inputs, two data bit inputs, and a carry bit input from the adjacent less significant stage. Neglecting the carry input the final bit derived in each stage of the adder should be a 1 only if only one of the input bits is a 1. If both input bits are 0's the final bit should be a 0, and if both are 1's a carry should be generated to the next stage and the bit represented by the stage should be a 0. The ring sum represents the value of the bit to be represented by the stage if the stage receives no carry from the previous stage. The complemented ring sum output of gate 41 is high, representing a 1, only if bits $X_j$ and $X_k$ contained in the cell are equal, and when control conductor $S_0$ is pulsed gate 42 is operated to place flip-flop $\overline{S}_i$ in the 1 state. It should be noted that the flip-flop is designated $\overline{S}_i$ rather than $S_i$. If the ring sum is a 0 the flip-flop is set in the 1 state. The reason for setting the flip-flop in the state opposite to that represented by the ring sum will become apparent below.

Referring to the last equation which represents the output of OR gate 41 it is seen that other useful functions may be formed. For example, suppose that all of the A data inputs are 1's, $B_F$ is a 1, and $A_F$ and $A_M$ are 0's. The equation reduces to $X_jX_k$. . . . In other words, the output of the OR gate represents the product of all data bits stored in the cell. Similarly, if all of the data inputs are 1's, and if $A_F$ is a 1 rather than $B_F$, and $B_M$ is a 0, the equation reduces to $(\overline{X}_j)(\overline{X}_k)$ . . . , i.e., the output of gate 41 represents the product of all of the complemented bits represented by the cell. It is also possible to query a single bit position. Suppose all of the data input signals are made "don't-cares" except for input signals $A_j$ and $B_j$ for which $A_j$ is a 1 and $B_j$ is a 0. If $A_F$, $A_M$ and $B_M$ are all 0's and $B_F$ is a 1, the equation reduces to $X_j$. Similarly, if $B_j$ is a 1 and $A_j$ is a 0, and if $A_F$ is a 1 rather than $B_F$, the equation reduces to $\overline{X}_j$.

Two of the most useful intermediate functions derived by the circuit are $\overline{\alpha}_i$ and $\beta_i$ themselves. Suppose only two bit positions, *j* and *k* for example, are to be queried by the fourth input state $A_j=A_k=B_j=B_k=1$, with all other data input pairs representing "don't-cares," and with all of signals $A_F$, $B_F$, $A_M$ and $B_M$ being 0's. In such a case $\overline{\alpha}_i=(X_j)(X_k)$ and $\beta_i=X_j+X_k$. $\overline{\alpha}_i$ is the "carry generation" function and $\beta_i$ is the "carry continuation" function. If the data words contained in the *j* and *k* position flip-flops in a series of cells are to be added together, the carry generation function derived in each stage is a 1 independent of the carry bit received from the previous stage if bits $X_k$ and $X_j$ are both 1's. The carry generation bit is extended to the adjacent higher-ordered stage to indicate that the final bit output derived by this stage should be increased by 1. The carry continuation function indicates that at least one of the two bits represented in cell *i* is a 1. If both are 1's the carry generation function energizes the carry input to the succeeding stage. If both of bits $X_j$ and $X_k$ are not 1's however but only one of them is, the carry continuation function is a 1 and is an indication in the cell that a carry should be generated and extended to the succeeding stage only if a carry is received from the preceding stage.

With these remarks in mind the carry generation circuit which includes gate 43 and OR gate 44 is easily understood. Gate 43 has three inputs, one of which is the output of gate 57. This output is energized if flip-flop $M_i$ is in the 1 state or if control conductor $D_M$ is pulsed. (The addition operation can be performed only in cells whose M flip-flops are in the 1 state or in all cells if conductor $D_M$ is pulsed.) The $\beta_i$ signal is one input of gate 43. The last input to this gate is connected to the output of OR gate 44. OR gate 44 has two inputs $\overline{\alpha_i}$ and $PL_{i-1}$. $PL_{i-1}$ is the carry bit from the lower order cell to the right. A carry bit $PL_i$ to cell $i+1$ must be generated by gate 43 if the carry generation function $\overline{\alpha_i}$ is a 1, or if the carry continuation function $\beta_i$ is a 1 and the carry bit $PL_{i-1}$ from the preceding cell is also a 1. Consider the first case in which the carry generation function is a 1, OR gate 44 operating and the respective input of gate 43 being energized. Since $\overline{\alpha_i}$ is a 1 both of bits $X_j$ and $X_k$ are 1's and $\beta_i$, $X_j+X_k$, must also be a 1. Consequently, the $\beta_i$ input to gate 43 is energized and a carry bit $PL_i$ is generated and transmitted to cell $i+1$. Now, consider the second case in which $\overline{\alpha_i}$ is a 0 but $\beta_i$ is a 1. In such a case only one of bits $X_j$ and $X_k$ is a 1 and the carry bit $PL_i$ should be generated only if a carry bit $PL_{i-1}$ is received from the preceding stage. As seen in FIG. 3, with $\beta_i$ being a 1 one of the inputs of gate 43 is energized. If a carry is received from cell $i-1$, OR gate 44 operates to energize the respective input to gate 43 and a carry bit $PL_i$ is generated as required. These operations are summarized by the following equation (assuming gate 57 operates) in which $PL_{i-1}$ is the input carry bit $C_{in}$ extended to cell *i*, and $PL_i$ is the output carry bit $C_{out}$ generated by the *i*th cell:

$$\begin{aligned} PL_i &= (\overline{\alpha_i}+PL_{i-1})\beta_i = (X_jX_k+C_{in})(X_j+X_k) \\ &= X_jX_k+X_jC_{in}+X_kC_{in} \\ &= C_{out} \end{aligned}$$

In addition to the propagation of carry bits to the left, signals may also be propagated to the right between adjacent cells. The $\overline{\alpha_i}$ signal derived in each cell may be extended to the adjacent cell on the right. As seen in FIG. 3 the $\overline{\alpha_{i+1}}$ signal from cell $i+1$ is connected to an input of gate 45. If the $C_R$ control signal is high and gate 57 operates, then if $PR_{i+1}$ is a 1 gate 45 operates to transmit a pulse through OR gate 46 to set the carry control flip-flop $C_i$ in the 1 state.

With these remarks in mind the operation of the cell of FIGS. 3 and 4 may be understood. The write or STORE operation is similar to that in the Crane et al. cell. If control conductor W is energized, one input to each of gates 47 and 48 is high. Another input of each of these gates is connected to the output of OR gate 57. Thus if flip-flop $M_i$ is in the 1 state or if conductor $D_n$ is pulsed gates 47 and 48 may operate depending upon the signals applied to the third input of each gate. If a pulse is transmitted through OR gate 49, gate 47 operates. Since inverter 50 inverts the pulse a 0 is applied to the third input of gate 48 and this gate does not operate. On the other hand, if OR gate 49 does not operate the 0 at its output is inverted by inverter 50 and gate 48 operates rather than gate 47. The output of gate 48 is connected to one of the inputs of the reset gate associated with each data flip-flop such as gates 51 and 52. If the respective data input conductor such as $A_1$ or $A_n$ is pulsed together with the operation of gate 48 the respective flip-flop is set in the 0 state. The output of gate 47 is connected to an input of each of the set gates such as 53 and 54. The other input of each of these gates is connected to a B data input conductor such as $B_1$ and $B_n$. If one of these B data input conductors is pulsed together with the operation of gate 47 the respective flip-flop will be set in the 1 state. In a typical STORE operation those flip-flops which are not to be written into have neither of their respective A and B data input conductors pulsed. The flip-flops which are to be written into have both of their A and B data input conductors pulsed. One of gates 47 and 48 operates and the selected flip-flops have the appropriate bit stored in them. The STORE operation is executed in all cells if conductor $D_M$ is pulsed or only in active cells (those with their $M_i$ flip-flops in the 1 state) if conductor $D_M$ is not pulsed.

The READ operation is similar to that in the Crane et al. system. Each of the output conductors such as $O_1$ or $O_n$ in any cell is made high in potential if the respective flip-flop is in the 1 state, and if the $M_i$ flip-flop in the cell is in the 1 state. For example, the common output conductor $O_n$ is made high in potential as a result of the $M_i$ flip-flop and $X_n$ flop-flop in any cell both being in the 1 state. The $O_m$ output conductor is similarly high in potential only if at least one of the cells in the array contains an M flip-flop in the 1 state.

As described above gate 40 is used to derive the function $\overline{\alpha_i}\overline{\beta_i}$ to set flip-flop $M_i$ in the 1 state. Gate 40 operates however only if the $S_A$ control conductor is energized. The $R_{\bar{s}}$ and $R_{\bar{c}}$ control conductors are energized to reset respective $\overline{S}$ and C flip-flops in all cells in the array. The $A_M$ and $B_M$ control conductors are energized to enable the operation of either of gates 36 or 37 to affect the $\alpha_i$ and $\beta_i$ functions derived by OR gates 30 and 31 in any cell if these functions are to be made dependent on the state of the $M_i$ flip-flop. These conductors are also energized to enable the operation of gates 62 and 63 if the $M_i$ flip-flop in any cell is to be set or reset in accordance with which of gates 47 and 48 operates, i.e., the $M_i$ flip-flop in a cell may be written into just as one of the data flip-flops may be written into. The $S_0$ control conductor is energized to enable the operation of gate 42 only when it is desired to set flip-flop $\overline{S}_i$ in the 1 state if the function $(\alpha_i+\overline{\beta_i})$ is a 1. Control conductor $C_S$ is energized when it is desired to set the C flip-flops in all cells in the 1 state. If the $C_i$ flip-flop in each cell is to be set in the 1 state only if the PL signal from the preceding cell is a 1, conductor $C_L$ is pulsed. If this conductor is pulsed, one input to gate 56 is energized. If the $PL_{i-1}$ bit generated in cell $i-1$ is also a 1 the other input of gate 56 is energized and the gate transmits a pulse through OR gate 46 to set flip-flop $C_i$ in the 1 state. Control conductor $C_R$ is pulsed when the $C_i$ flip-flop in a cell is to be set in the 1 state, dependent upon the signal generated by the cell to the left. The setting of the flip-flop in the 1 state is made dependent on the operation of gate 57, the output of which is connected to an input of gate 45. If gate 57 operates and conductor $C_R$ is pulsed, then if $PR_{i+1}$ is a 1, gate 45 operates and transmits a pulse through OR gate 46 to set flip-flop $C_i$ in the 1 state.

(B) *Exemplary operational sequences*

An array of cells of the type shown in FIGS. 3 and 4 is capable of performing numerical operations very rapidly. This may be appreciated by considering the addition operation which in the Crane et al. system requires ten steps. Suppose that data words are stored as described above with one bit in each cell and it is necessary to add the data word stored in the $X_3$ flip-flops in a series of cells to the data word stored in the $X_5$ flip-flops in the same series of cells, and to store the sum in the $X_7$ flip-flops in the cells. The first step is to reset the C and $\overline{S}$ flip-flops in all cells by pulsing control conductors $$R_c \text{ and } R_{\overline{s}}.$$

The second step comprises two substeps. In the first substep all of the A and B data input signals and made 0's except for signals $A_3$, $A_5$, $B_3$ and $B_5$ which are 1's. In the second substep conductors $C_L$ and $S_0$ are pulsed. With the pulsing of only conductors $A_3$, $A_5$, $B_3$ and $B_5$ the $\overline{\alpha}_i$ signal derived in cell $i$ is $(X_3)(X_5)$ and the $\beta_i$ signal is $(X_3+X_5)$, where $X_3$ and $X_5$ are the bits contained in cell $i$ in the third and fifth data flip-flops. OR gate 41 operates to derive the complement of the ring sum of the two bits and gate 43 operates to propagate a carry bit $PL_i$ to cell $i+1$ if a carry must be generated. A sufficient time interval must be allowed for the carry bits to be generated down the line to the left, since the carry generated in each cell may be dependent on the receipt of a carry from the preceding cell. When conductors $C_L$ and $S_0$ are pulsed, gate 42 operates to set flip-flops $\overline{S}_i$ in the 1 state only if both of bits $X_3$ and $X_5$ are the same. Gate 56 operates to set flip-flop $C_i$ in the 1 state only if a carry was received from the preceding cell.

In the third step conductor W is pulsed. At the same time all of the A and B data input signals are made 0's except signals $A_7$ and $B_7$ which are both 1's. Because signals $A_7$ and $B_7$ are 1's the $X_{7i}$ flip-flop in cell $i$ may be written into, dependent upon which of gates 47 or 48 operates. If gate 47 operates a 1 is written into the flip-flop, and if gate 48 operates a 0 is written into the flip-flop. The final state of the flip-flop represents a final bit in the sum. This bit must be a 1 only if one of two conditions exists. If a carry was received by cell $i$ the bit must be a 1 only if neither or both of bits $X_3$ and $X_5$ are 1's. Since flip-flop $\overline{S}_i$ represents the complement of the ring sum of bits $X_3$ and $X_5$ the 1 output is high in potential only if neither or both of bits $X_3$ and $X_5$ are 1's. In such a case one input to gate 60 is energized. The other input to this gate is connected to the 1 output of flip-flop $C_i$. Consequently if neither or both of bits $X_3$ and $X_5$ are 1's and if a carry bit was received by cell $i$ in the second step, gate 60 operates to transmit a pulse to OR gate 49. The other case in which the final bit in flip-flop $X_{7i}$ must be a 1 is where the complement of the ring sum previously derived in the cell is a 0 and a carry bit was not received by cell $i$. In this case the 0 output of the $\overline{S}_i$ flip-flop is high as is the 0 output of the $C_i$ flip-flop, neither of these flip-flops having been set in the second step. In such a case both inputs to gate 61 are energized and this gate transmits a pulse to OR gate 49. In either case OR gate 49 operates to control the operation of gate 47 rather than gate 48. A 1 is thus stored in flip-flop $X_{7i}$ in cell $i$. If a carry was not received by cell $i$ and the complement of the ring sum of bits $X_3$ and $X_5$ in the cell is a 1, or if the complement of the ring sum is a 0 and a carry was received by the cell, neither of gates 60 and 61 operates. In such a case OR gate 49 does not operate and gate 47 is not energized. Due to the inverting action of inverter 50 gate 48 operates to control the writing of a 0 in flip-flop $X_{7i}$ in the cell. It should be noted that the outputs of flip-flops $C_i$ and $\overline{S}_i$ in the cell are connected to gates 60 and 61, which in turn are connected to OR gate 49, in such a manner that the outputs of the two flip-flops are combined in an exclusive-OR-not circuit. It should further be noted that the addition may be performed in all cells, or only in active cells (those whose M flip-flops are in the 1 state). In the third step data is written into the $X_7$ flip-flops of all cells if conductor $D_M$ is pulsed. If the conductor is not pulsed, data is written into only those cells whose $M_i$ flip-flops are in the 1 state. Gates 47 and 48, for example, may operate only if flip-flop $M_i$ in FIG. 3 is in the 1 state thus operating OR gate 57.

Many more numerical type operations may be performed rapidly in an array of cells of the type shown in FIGS. 3 and 4. Additional examples will be given below with reference to the second illustrative embodiment of the invention shown in FIGS. 8 and 9. Before considering this cell, however, it must be understood that the numerically oriented cells can also be used to control non-numerical operations. Consider a left shift operation in which each M flip-flop is caused to be placed in the state initially represented by the M flip-flop in the adjacent cell on the right. In the first step conductors $R_c$ and $S_0$ are pulsed to reset all C flip-flops and to set all $\overline{S}$ flip-flops. The $R_c$ signal directly resets each C flip-flop. The $S_0$ signal enables gate 42 in each cell. Since the $\alpha_i$ and $\beta_i$ signals in each cell are normally high, OR gate 41 in each cell operates to energize gate 42. With the energization of gate 42 a pulse is transmitted through OR gate 65 to set flip-flop $\overline{S}_i$ in the 1 state. Since both $\alpha_i$ and $\beta_i$ in each cell are normally 1's, conductor $S_A$ could be pulsed rather than conductor $S_0$ to set the $\overline{S}_i$ flip-flop through gate 40 rather than OR gate 41.

In the second step of the operation, conductors $A_M$, $B_M$ and $C_L$ are pulsed. Consider the $PL_i$ signal developed in each cell. If a cell's M flip-flop is in the 0 state, the $PL_i$ signal is low; since conductor $D_M$ is not pulsed, gate 57 does not operate and the $[D_M+M_i]$ term in the $PL_i$ function is a 0. If a cell has its M flip-flop in the 1 state, this term is a 1 and the $PL_i$ signal is a 1 if the $[PL_{i-1}+\overline{\alpha}_i]\beta_i$ term is a 1. If the $M_i$ flip-flop is in the 1 state, the $A_M$ and $B_M$ signals cause $\beta_i$ and $\overline{\alpha}_i$ to both be 1's and thus the $PL_i$ signal is a 1. (It should be noted that a signal is generated to the next cell only if the $M_i$ flip-flop is in the 1 state. Even if the $PL_{i-1}$ signal received by a cell is a 1, the $PL_i$ signal is a 0 if flip-flop $M_i$ is in the 0 state since $\beta_i$ will be a 0.) The $C_L$ signal causes each $C_i$ flip-flop to be set in the 1 state if the $PL_{i-1}$ signal received from the preceding cell is a 1.

In the third step conductors $A_M$, $B_M$, $D_M$ and W are pulsed. The $D_M$ and W signals enable one of gates 47 and 48 to operate and the $A_M$ and $B_M$ signals enable one of gates 62 and 63 to operate to write a bit value into the $M_i$ flip-flop depending upon which of gates 47 and 48 operates. The $\overline{S}_i$ flip-flop in each cell was set in the 1 state during the first step and is still in this state. Flip-flop $\overline{C}_i$ is in the 1 state only if the $\overline{M}_i$ flip-flop in the preceding cell was in the 1 state when the second step was executed. If it was, gate 47 operates to write a 1 into flip-flop $M_i$. If the M flip-flop in the preceding $i$–1 cell was in the 0 state, gate 48 in cell $i$ operates to control the writing of a 0 in flip-flop $M_i$. Thus at the end of the third step the states of the M flip-flops have been shifted one cell to the left. By pulsing conductor $C_R$ in the second step rather than conductor $C_L$, a right shift operation may be performed.

(IV) ILLUSTRATIVE CELL FOR USE IN A TWO-DIMENSIONAL MEMORY

(A) *Details of individual cell*

A second embodiment of my invention is shown in FIGS. 8 and 9. This cell is different from the previous one in three major respects. First, the M flip-flop is omitted from the cell. Second, the $A_M$, $B_M$ and $D_M$ inputs are no longer provided since the M flip-flop is omitted, the $S_0$ and $S_A$ signals are replaced by the single S signal, and there are five new input signals, $Y_k$, $A_I$, $B_I$, $I_{AI}$ and $I_{BI}$. Third, the carry signals, $PL_i$ and $PR_i$, derived in the cell are similar in form. Thus, while in the previously considered cell the continuous propagation of signals is possible only in the left direction since any signal ($\overline{\alpha}_i$) extended to the right of a cell only controls the setting of the C flip-flop in the adjacent cell, in the second embodiment of the invention signals may be propagated through OR and AND gates in either direction.

In the two-dimensional array of the above-identified Crane et al. continuation-in-part application, 24 X cells are associated with each Y cell. There is a signal derived in each Y cell (the signal on conductor 812 in the Crane et al. application) which is extended to each of the 24 associated X cells. This signal is a function both of the activity condition of the Y cell and certain data contained in flip-flops Y25 through Y30 of the cell. This signal is shown in FIGS. 8 and 9 (an X cell) as $Y_k$. The signal must be high in order for various ones of the operations to be described below to be performed in each of the 24 X cells associated with Y cell *k*. In the Crane et al. two-dimensional array there is also a signal (appearing on conductor 931) which is dependent upon the states of the 24 X cells in any group and is extended to the respective Y cell to control operations therein. A similar signal may be derived from the X cell of FIGS. 8 and 9 and the 23 associated cells, although on FIGS. 8 and 9 this circuitry is not shown. The manner in which this signal may be derived will be apparent to those skilled in the art. In the Crane et al. two-dimensional array data is read out of only the Y cells. For this reason the X cells in the Crane et al. array as well as the X cell in FIGS. 8 and 9 are not provided with output conductors $O_1$ through $O_n$ as in the cell of FIGS. 3. and 4. In array of cells of the type shown in FIGS. 8 and 9 if data is to be read out after it is derived in an X cell it must first be transferred to the respective $X_n$ flip-flop which is shared by the respective Y cell. Flip-flop $X_{n1}$ is shared by the respective Y cell and accordingly Y data inputs control the writing of data in this flop-flop and output conductors are provided in the Y cell for reading data out of this flip-flop. Since the connection of the input and output conductors of the Y cell associated with flip-flop $X_{n1}$ will be apparent to those skilled in the art from an examination of the detailed circuitry in the Crane et al. application, these details are not shown in FIGS. 8 and 9.

Referring to FIGS. 5, 6 and 7 it will be recalled that 24 F conductors are provided, each connected to a respective X cell in each group of 24. For example, conductor $F_{15}$ is connected to the 15th X cell in each group. A similar conductor is coupled to the cell of FIGS. 8 and 9. Conductor $F_i$ is connected to the *i*th X cell in each group and various ones of the operations to be described below are performed in a particular X cell only if the respective $F_i$ conductor is energized. Two additional data input conductors are provided in FIGS. 8 and 9. Each X cell has extended to it signals transmitted over respective conductors $I_{A1}$ and $I_{B1}$. The signals on these conductors may be derived from the associated Y cell or from an external source. These additional signals are shown in the cells of FIGS. 8 and 9 merely to illustrate one of the many variations which are possible. Instead of deriving the signals from the associated Y cell it is possible to derive them from the same external source which produces the F signals. In such a case a pair of signals $I_{A1}$ and $I_{B1}$ would be associated with each $F_i$ signal. Thus, for example, with conductor $F_{15}$ being connected to the 15th X cell in each group of 24, conductors $I_{A15}$ and $I_{B15}$ would be similarly connected to the 15th X cell in each group. The signals on this pair of conductors are complementary. Conductors $A_I$ and $B_I$ are two additional X cell control conductors, connected to each X cell in the array. While one of signals $I_{A1}$ and $I_{B1}$ may be high in potential the respective one of gates 70 and 71 operates only if the respective control conductor $A_I$ or $B_I$ is pulsed. If gate 70 operates OR gate 72 operates to cause the $\alpha_1$ signal to be a 1 and if gate 71 operates OR gate 73 is energized to cause the $\beta_1$ signal to be a 1.

The cell of FIGS. 8 and 9 is numerically oriented; a great number of numerical operations may be performed, each requiring the execution of at most three instructions. Before proceeding to a description of illustrative sets of instructions a general examination of the cell of FIGS. 8 and 9 will be helpful. The $\alpha_1$ and $\beta_1$ signals are similar to those derived in the previously considered cell. The major difference is that each of OR gates 72 and 73 is no longer provided with an input determined by the state of an M flip-flop and instead each of the OR gates is provided with an input which is determined by the operation of one of gates 70 and 71. The two matching OR gates are still provided with $A_F$ and $B_F$ inputs. OR gate 74 operates on the $\overline{\alpha_1}$ and $\overline{\beta_1}$ signals and if OR gate 74 operates together with the pulsing of control conductor S gate 75 causes the flip-flop $\overline{S}_1$ to be set in the 1 state.

Data bits are written into flip-flops $X_{11}$ through $X_{n1}$ in accordance with the operation of one of gates 76 and 77. The W control signal must be applied in order for the write operation to take place. In the previously considered cell a second input of each of the writing gates was derived from the M flip-flop or the $D_M$ conductor, i.e., a STORE operation could take place only in an active cell unless the $D_M$ conductor was pulsed. In the cell of FIGS. 8 and 9 there is no M flip-flop. The second input to each of the writing gates is derived from the output of gate 78. This gate is energized only if conductors $F_i$ and $F_k$ are energized. Thus a STORE operation can take place in a particular X cell only if the respective F conductor is energized and only if the respective $Y_k$ conductor from the associated Y cell is energized. If the energization of conductor $Y_k$ is made dependent on the activity condition of the associated Y cell *k*, X cell 15, for example, associated with this Y cell may perform a STORE operation only if Y cell *k* is active and conductor $F_{15}$ is energized by the external source. The third input to gate 76 is derived from the output of OR gate 79, and the third input to gate 77 is derived from the output of inverter 80. Even if the W conductor is pulsed and gate 78 operates, only one of gates 76 and 77 may control a STORE operation since the third inputs to these two gates are complementary. If flip-flops $C_1$ and $\overline{S}_1$ are both in the 0 state gate 81 operates, and if both flip-flops are in the 1 state gate 82 operates. In either case a pulse is transmitted through OR gate 79 to control the energization of gate 76. When this gate operates any of the data flip-flops whose respective B input conductor is energized may be set in the 1 state. For example, if conductors $B_1$ and $B_n$ are both pulsed together with the W conductor (assuming that conductor $F_i$ is also pulled and conductor $Y_k$ is high in potential), and if the same bit value, 0 or 1, is represented by both of flip-flops $C_1$ and $\overline{S}_1$, gates 83 and 84 operate to set flip-flops $X_{11}$ and $X_{n1}$ in the 1 state. Similarly, if flip-flops $C_1$ and $\overline{S}_1$ contain bits of opposite values neither of gates 81 or 82 operates and OR gate 79 remains de-energized. In such a case inverter 80 applies a positive potential to the third input of gate 77 and this gate operates rather than gate 76. If conductors $A_1$ and $A_n$ are pulsed gates 85 and 86 operate to reset flip-flops $X_{11}$ and $X_{n1}$ in the 0 state. Thus it is seen that once the C and $\overline{S}$ flip-flops in any X cell are set in the desired states, 1's may be written in selected X flip-flops if the C and $\overline{S}$ flip-flops are in the same state, and 0's may be written in selected X flip-flops if the C and $\overline{S}$ flip-flops are maintained in opposite states.

Conductor $O_M$ in the cell previously considered is energized if the respective M flip-flop is in the 1 state. If the M flip-flop in any cell in the array is in the 1 state this common output conductor is high in potential. A similar conductor is provided for the cell of FIGS. 8 and 9. Since the cell does not include an M flip-flop, the 1 output of the $\overline{S}$ flip-flop is used to derive an $O_{\overline{s}}$ signal. If any cell in the array contains an $\overline{S}$ flip-flop in the 1 state common output conductor $O_{\overline{s}}$ is high in potential.

In the cell of FIGS. 3 and 4 gate 43 is used to control the propagation of a carry signal $PL_I$ to the left. The gate includes three inputs. The first is derived from OR gate 57, whose operation in turn is controlled by the $D_M$ signal and the 1 output of the $M_i$ flip-flop. The second is the $\beta_i$ signal derived in the cell. The third is the output of OR gate 44 which is energized if a carry bit is received from the adjacent cell to the right or if the $\bar{\alpha}_i$ signal derived in the cell is a 1. Gate 88 in FIG. 8 and 9 performs the same function as gate 43 in in FIGS. 3 and 4. However, the inputs to this gate are slightly different. A first input is derived from the output of gate 87. Thus for gate 88 to operate both inputs to gate 87 must be energized. One of the inputs to gate 87 is the $\beta_i$ signal and thus gate 88 can operate, like gate 43, only if the $\beta_i$ signal derived in the cell is a 1. The second input to gate 87 is the output of gate 78. This gate operates only if operations are to be performed in the cell and consequently this second input to gate 87 is equivalent to the input from OR gate 57 in the previously considered cell connected to gate 43. The second input to gate 88 is derived from OR gate 89. This OR gate is similar to OR gate 44 in the previously considered cell. OR gate 44 operates if the $\bar{\alpha}_i$ signal derived in the cell is a 1 or if a carry bit is received from the adjacent cell to the right. Similarly, gate 89 operates if the $\bar{\alpha}_i$ signal derived in the cells of FIGS. 8 and 9 is a 1 or if a carry bit $PL_{i-1}$ is received from the adjacent cell to the right. In addition OR gate 89 is provided with a third input, the 1 output of flip-flop $C_i$. If gate 88 operates the $PL_i$ signal extended to the adjacent cell to the left is a 1. OR gate 90 and gate 91 are identical to OR gate 89 and gate 88 except that these gates control the propagation of signals to the right. One of the inputs to OR gate 90 is the signal received from the adjacent cell to the left, $PR_{i+1}$. The signal extended to the adjacent cell to the right is $PR_i$. It is to be noted that the $\bar{\alpha}_i$ signal derived in each cell is no longer directly extended to the adjacent cell to the right. This signal may be extended only if gate 87 operates.

In the cell of FIGS. 3 and 4 flip-flop $C_i$ may be set in the 1 state if either of three conditions exist. If conductor $C_L$ is pulsed together with the receipt of a carry signal from the adjacent cell to the right, or if conductor $C_R$ is pulsed together with the receipt of an $\bar{\alpha}_{i+1}$ signal from the adjacent cell to the left when OR gate 57 operates, or if conductor $C_s$ is pulsed, flip-flop $C_i$ is set in the 1 state. Similarly, in the cell of FIGS. 8 and 9 flip-flop $C_i$ may be set in the 1 state if one of three conditions exists. If conductor $C_s$ is pulsed together with conductor $F_i$, gate 92 operates and transmits a pulse through OR gate 93 to set flip-flop $C_i$ in the 1 state. If conductor $C_L$ is pulsed together with the receipt of the $PL_{i-1}$ signal from the adjacent cell to the right, gate 94 operates to control the setting of flip-flop $C_i$. Finally, if conductor $C_R$ is pulsed together with the receipt of a $PR_{i+1}$ signal from the adjacent cell to the left, gate 95 operates to control the setting of the flip-flop in the 1 state.

(B) *Exemplary operational sequences*

With these remarks in mind it is possible to understand some of the individual operations which may be performed in the cell of FIGS. 8 and 9. In all of the control pulse sequences to be described below it is to be understood that the $F_i$ conductor extended to the cell is pulsed and the $Y_k$ conductor extended to the cell is high in potential. Gate 78 must operate in order that one of gates 76 and 77 operate to control the writing of a bit in selected data flip-flops, or in order for the $PR_i$ and $PL_i$ signals to be extended in opposite directions to the adjacent cells. Thus unless stated otherwise it is to be assumed in each of the sequences to be described below that the $F_i$ conductors extended to the cells in which the operation is to be performed, as well as the respective $Y_k$ conductors, are energized. Each sequence requires three steps, (a), (b) and (c). Step (a) is an initialization state in which the $\bar{S}$ and C flip-flops in the various cells are set to the desired reference states. In step (b) the states of the various input lines $A_1$, $B_1$ through $A_n$, $B_n$, $A_F$, $B_F$, $A_I$ and $B_I$ are established. After allowing an interval for the switching times of the logic circuitry (including carry propagation in those operations using it), the gating signals to the C and $\bar{S}$ flip-flops are applied. This time interval in step (b) is shown by a double dash. The third step, (c), is the write phase in which the desired data flip-flops are selected and the write signal W is given. In each of the following sequences the only control signals which are given are those shown. All other signals are not applied. For each operation the abbreviated representation of the operation is first given, followed by a description of the manner in which the order is executed. It is to be borne in mind that each data word is stored with each bit in a different cell. Thus a particular data word, for example, may be stored in the $X_3$ flip-flops in a sequence of adjacent cells. A data word is represented by an expression such as (*j*). This expression identifies a data word each bit of which is stored in the $X_j$ flip-flop of a cell in a sequence of adjacent cells.

(1) ADD *i, j, k:* (*i*) is added to (*j*) and the sum is stored in the $X_k$ flip-flops of the same cells.

| | |
|---|---|
| (a) | $R_o$, $R_{\bar{s}}$ |
| (b) | $A_i$, $A_j$, $B_i$, $B_j$—$C_L$, S |
| (c) | $A_k$, $B_k$, W |

In the first step the C flip-flop and the $\bar{S}$ flip-flop in each cell are both reset to the 0 state. In the second step the states of the input lines $A_i$, $A_j$, $B_i$ and $B_j$ are established. With the two input lines to each of flip-flops $X_i$ and $X_j$ in each cell high in potential either of the two output gates associated with each flip-flop is enabled to operate. Which of the two gates operates depends on the state of the flip-flop. For example, suppose input conductors $A_1$ and $B_1$ are pulsed; gate 96 operates to cause the $\alpha_i$ signal to be a 1 if flip-flop $X_{1i}$ is in the 0 state and gate 97 operates to cause $\beta_i$ to be a 1 if the flip-flop is in the 1 state. At the end of step (b) the $C_L$ and S conductors are pulsed. Assuming that the cell of FIGS. 8 and 9 is one of those in which the operation is to be performed the $F_i$ and $Y_k$ signals are both high and with the application of the $C_L$ and S signals flip-flops $C_i$ and $S_i$ are set in the desired states. Consider the four possible combinations of the states of the $X_i$ and $X_j$ flip-flops in cell *i*. If both flip-flops are in the 0 state $\alpha_i$ is a 1 and $\beta_i$ is a 0. The high $\bar{\beta}_i$ signal energizes OR gate 74 and with the application of the S signal, gate 75 causes flip-flop $\bar{S}_i$ to be set in the 1 state. If both flip-flops are in the 1 state, $\alpha_i$ is a 0 and $\beta_i$ is a 1. It is the $\bar{\alpha}_i$ signal which operates OR gate 74 to set the $\bar{S}_i$ flip-flop in the 1 state. But if the two flip-flops are in opposite states $\alpha_i$ and $\beta_i$ are both 1's, $\bar{\alpha}_i$ and $\bar{\beta}_i$ are both 0's, OR gate 74 does not operate, and flip-flop $\bar{S}_i$ remains in the 0 state. Thus, flip-flop $\bar{S}_i$ is set in the 1 state only if the two bits originally contained in the two different words in cell *i* are both 1's.

Consider next the signal which is propagated through gate 88 to the adjacent cell on the left. (Although a signal may also be propagated to the right the signal has no effect since the signal received by each cell from the cell to its left does not control the setting of the respective C flip-flop since conductor $C_R$ is not pulsed.) If flip-flops $X_i$ and $X_j$ both represent 1's, a carry bit should be extended to the adjacent cell to the left. Gate 87 operates to energize one input of gate 88 since $\beta_i$ is a 2. Since the $\bar{\alpha}_i$ signal is a 1 if both bits stored in cell *i* are 1's ($\bar{\alpha}_i$ is a 1 since OR gate 72 does not operate), OR gate 89 operates to energize the other input of gate 88. Thus if both bits in cell *i* are 1's a carry bit is propagated to the adjacent cell to the left. Suppose only one of the bits stored in flip-flops $X_i$ and $X_j$ is a 1. In such a case $\alpha_i$ and $\beta_i$ are both 1's. Gate 87 still operates to energize one input of gate 88. A carry should be extended to the adjacent cell to the left however only if a carry bit is received over conductor $PL_{i-1}$ from the adjacent cell to the right, since only in this case are two of the bits operated upon by cell *i* both 1's. Since the 1 output of flip-flop $C_i$ is low and the $\overline{\alpha_i}$ signal is also low, two of the inputs of OR gate 89 are de-energized. The OR gate operates only if a carry signal is received over conductor $PL_{i-1}$ from the adjacent cell to the right. In such a case gate 88 operates and extends a carry signal $PL_i$ to the adjacent cell to the left. Suppose finally that both of the bits contained in cell *i* are 0's. In such a case $\beta_i$ is a 0 and gate 87 does not operate. Consequently gate 88 cannot operate even if a carry is received from the adjacent cell to the right. No carry is generated to the next cell. This is the desired result since in order for a carry to be generated at least two of the three bits operated upon by each cell must be 1's.

Consider now the bit stored in flip-flop $C_i$ with the application of the $C_L$ pulse. Since the second input to gate 94 is the $PL_{i-1}$ signal the $C_i$ flip-flop is set in the 1 state only if a carry is received from the adjacent cell to the right, the cell representing the less significant bits. It should be noted that the application of the $C_L$ and S pulses are delayed until a sufficient time has been allowed for the carry signals to be propagated down the line to the left. A carry signal may be generated in any cell if at least one of the two respective stored bits is a 1 and a carry bit is received from the adjacent cell to the right. Consequently the $C_L$ and S pulses must be delayed until a sufficient time has been allowed for the carry signals to be propagated through all of the cells containing data words to be added together.

In the third step since conductors $A_k$ and $B_k$ are both pulsed together with conductor W, a 0 or a 1 may be written into flip-flop $X_{ki}$ depending upon which of gates 76 and 77 operates. Suppose flip-flop $\overline{S}_i$ is still in the 0 state, the state of the flip-flop not having been changed in step (b). Since the flip-flop is set in the 1 state in step (b) if the two bits contained in cell *i* have the same value, if flip-flop $\overline{S}_i$ is still in the 0 state it is an indication that one and only one of the two bits originally contained in cell *i* is a 1. If the carry bit received from the adjacent cell to the right was a 0 the final bit to be stored in cell *i* should be a 1, and if the carry bit was a 1 the final bit to be stored in cell *i* should be a 0 since the addition of two 1's produces a sum bit of 0. Since flip-flop $\overline{S}_i$ is in the 0 state the only one of gates 81 and 82 which may operate is gate 81. This gate operates only if flip-flop $C_i$ is in the 0 state, i.e., a carry bit was not received. In such a case gate 81 operates to cause gate 76 to control the writing of a 1 in flip-flop $X_{ki}$ as desired. If a carry bit was received neither of gates 81 and 82 operates and gate 77 causes a 0 to be written into flip-flop $X_{ki}$ as desired.

Consider now the case in which flip-flop $\overline{S}_i$ is in the 1 state. If the flip-flop was set in this state in step (b) it is an indication that the two bits originally contained in cell *i* are both 0's or both 1's. In either case the final bit to be stored in cell *i* should be a 1 only if a carry bit was received from the adjacent cell to the right. If a carry bit was received flip-flop $C_i$ is in the 1 state and since both flip-flops are in the 1 state gate 82 operates to cause gate 76 to control the writing of a 1 in flip-flop $X_{ki}$. If a carry bit was not received the two flip-flops are in opposite states, neither of gates 81 and 82 operates, and gate 77 causes a 0 to be written in flip-flop $X_{ki}$. This is the desired result because even if the two bits originally contained in cell *i* are both 1's, while the carry bit generated to the next cell is a 1 (the carry bit having been generated in step (b)) the final sum bit to be stored in cell *i* must be a 0 unless a carry bit was received from the adjacent cell to the right. Thus it is seen that the addition operation may be performed with the execution of three orders. The sum word appears in the $X_k$ flip-flops in the sequence of cells and by transferring the bits in these flip-flops to the associated Y cells as described in the above-identified Crane et al. continuation-in-part application, the sum word may be read out of the array.

(2) *ADD and INCREASE i, j, k.*—(*i*) is added to (*j*), the sum is increased by 1, and the result is stored in the $X_k$ flip-flops.

(a) $R_c$, $R_{\overline{s}}$—$F_{lsp}$, $C_s$ (b) $A_i$, $A_j$, $B_i$, $B_j$—$C_L$, S (c) $A_k$, $B_k$, W This sequence of operations is similar to that considered immediately above. The only difference is that in the first step after all of the C and $\overline{S}$ flip-flops are reset, the $C_s$ conductor is pulsed together with the F conductor extended to the cell in the least significant position (lSP). In order to add the number 1 to the sum a 1 is initially stored in the C flip-flop of the least significant cell in the string in which the addition operation is being performed. Each C flip-flop at the end of step (b) is a 1 if the cell receives a carry bit from the adjacent cell to the right. The carry bit has the effect of changing the sum bit which would otherwise be derived in the cell. The cell containing the least significant bit cannot possibly receive a carry bit from the preceding cell. By initially setting the C flip-flop in this cell in the 1 state a fictitious "carry" bit is generated, i.e., the cell operation in step (c) proceeds as if a carry was received from the preceding cell. This has the effect of adding 1 to the total sum. At the end of step (a) because only the F conductor extended to the cell in the least significant position is energized together with conductor $C_s$ the only C flip-flop which is set in the 1 state is that contained in the cell in the least significant position. The addition operation then proceeds in the ordinary manner.

(3) *SHIFT LEFT j, k.*—(*j*) is shifted left one place and stored in the $X_k$ flip-flops.

(a) $R_c$ (b) $A_j$, $B_j$—$C_L$, S (c) $A_k$, $B_k$, W

In the first step all of the C flip-flops are reset to the 0 state. With the application of the $A_j$ and $B_j$ signals in the second step only one of the $\alpha_i$ and $\beta_i$ signals in each cell is a 1 depending on the state of flip-flop $X_j$ in the cell. If $\alpha_i$ is a 1 the bit in flip-flop $X_j$ in cell *i* is a 0 and a 0 should be stored in flip-flop $X_k$ in cell *i*+1. If $\beta_i$ is a 1 flip-flop $X_j$ in cell *i* is in the 1 state and a 1 should be stored in flip-flop $X_k$ in cell *i*+1. Only if $\beta_i$ is a 1 can gates 87 and 88 in the cell of FIGS. 8 and 9 operate to transmit a $PL_i$ signal to cell *i*+1. OR gate 89 operates to energize the second input of gate 88 because if $\beta_i$ is a 1 $\overline{\alpha_i}$ is also a 1. Thus the PL signal received by each cell is a 1 only if a 1 is to be written into flip-flop $X_k$ in the cell.

During the second phase of step (b) the $C_L$ signal operates gate 94 to control the setting of flip-flop $C_i$ in the 1 state only if the PL signal received by the cell is a 1. At the same time since one of the $\bar{\beta}$ and $\overline{\alpha_i}$ signals must be high the output of gate 74 is high and the S signal causes gate 75 to operate to set flip-flop $\overline{S}_i$ in the 1 state.

In the third step the $A_k$ and $B_k$ signals allow a 0 or a 1 to be written in flip-flop $X_{ki}$ depending upon which of gates 76 or 77 operates. Flip-flop $\overline{S}_i$ is in the 1 state. If flip-flop $C_i$ has been set in the 1 state during step (b) both flip-flops are in the 1 state and a 1 is written into the $X_k$ flip-flop as required. On the other hand, if the PL signal received by cell *i* was a 0 flip-flop $C_i$ is still in the 0 state, and the opposite states of flip-flops $C_i$ and $\overline{S}_i$ causes a 0 to be written into flip-flop $X_{ki}$. A shift to the right is also possible if in the second phase of step (b) the $C_R$ conductor is pulsed rather than the $C_L$ conductor.

(4) *COMPLEMENT j, k.*—From the two's complement of (j) and store it in the $X_k$ flip-flops.

(a) $R_C$, $R_{\bar{S}}$, $A_j$, $B_F$—$C_L$
(b) $A_F$, $B_j$—S
(c) $A_k$, $B_k$, W The two's complement of a binary number may be formed in the following manner. Looking at the bits from the least significant, the rightmost bit, the bits are left unchanged if they are 0's. When the first 1 is reached this bit is also unchanged, but all bits to the left of this first 1, both 0's and 1's, are inverted. Thus, for example, the two's complement of the binary number 1011100 is 0100100. This algorithm is the one used in the three steps of the sequence.

In the first step the C and $\bar{S}$ flip-flops in each cell are reset in the 0 state. At the same time the $B_F$ and $A_j$ signals are applied to control the propagation of signals to the left. Since the signal propagation is independent of the C and S flip-flops, the four signals may be applied together. The $B_F$ signal in each cell causes the $\beta$ function derived in the cell to be a 1. The $A_j$ signal causes the $\alpha$ function to be a 1 only if the $X_j$ flip-flop in the cell contains a 0. If the cell containing the least significant bit contains a 0, the $\bar{\alpha}$ signal is a 0 and although gate 87 is enabled by the $\beta$ signal, OR gate 89 is not operated and a carry bit is not generated to the next cell. Similarly, if the second cell also contains a 0, a carry bit is not propagated. The first cell from the right which contains a 1 has its $\bar{\alpha}$ signal high in potential and a carry signal is propagated to the left. This first cell with a 1 has no carry signal transmitted to it from the previous cell, but all cells to its left receive carry bits because in each cell the $\beta$ signal is forced to be a 1 and a carry signal is received from the previous cell. After the propagation the $C_L$ signal causes the C flip-flops in all cells to the left of the first cell containing a 1 to be set in the 1 state.

In the second step the $A_F$ signal forces $\bar{\alpha}_i$ in each cell to be a 0. The $B_j$ signal causes the $\bar{\beta}_i$ signal to be a 1 only if flip-flop $X_j$ in the cell contains a 0. Thus OR gate 74 operates only if the bit in flip-flop $X_j$ is a 0 and with the application of the S signal the $\bar{S}$ flip-flop in the cell is set in the 1 state. Thus at the end of step (b) the state of the $\bar{S}$ flip-flop in each cell is opposite to the state of the $X_j$ flip-flop in the same cell. Since there is no signal propagation in step (b) the S conductor may be pulsed together with the other two.

In the third step, in each cell a 1 is written into the $X_k$ flip-flop only if the states of the respective C and $\bar{S}$ flip-flops are the same. Consider first all cells to the right of the first cell containing a 1. These cells have their C flip-flops in the 0 state. The $\bar{S}$ flip-flop in each cell is in the state opposite to the state of the $X_j$ flip-flop. Since these cells contain 0's, their $\bar{S}$ flip-flops contain 1's. Since, in all of these cells the C and $\bar{S}$ flip-flops are in opposite states, 0's are written into the $X_k$ flip-flops as required in the third step.

The first cell which contains a 1 also has its C flip-flop in the 0 state, but since its $X_j$ flip-flop is in the 1 state, its $\bar{S}$ flip-flop is in the 0 state. Consequently, the $X_k$ flip-flop in the cell is set in the 1 state in the third step. This is the desired result since the bit values in all cells to the right of and including the first cell having a 1 are to remain unchanged.

All cells to the left of the first cell with a 1 must have their bits inverted. The C flip-flops of all of these cells are in the 1 state. The $\bar{S}$ flip-flop of each of these cells is in the 1 state only if the cell contains a 0. If the cell contains a 0 in flip-flop $X_j$, the C and $\bar{S}$ flip-flops are in the same state and a 1 is written into flip-flop $Y_k$ in the third step. On the other hand, if one of these cells contains a 1, while its C flip-flop is in the 1 state its $\bar{S}$ flip-flop is in the 0 state and a 0 is writen into the $Y_k$ flip-flop in the third step.

(5) *AND i, j, k.*—Form the logical function $(i).(j)$ on a cell-by-cell basis and store it in the $X_k$ flip-flops.

(a) $C_S$, $R_{\bar{S}}$
(b) $A_i$, $A_j$, $B_F$—S
(c) $A_k$, $B_k$, W

In the first step the $\bar{S}$ flip-flop in each cell is reset in the 0 state and the C flip-flop in each cell is set in the 1 state. In the second step by $B_F$ signal causes $\beta_i$ in each cell to be a 0. The $A_i$ and $A_j$ signals enable the $\alpha_i$ signal to be a 1 if at least one of the $X_i$ and $X_j$ bits is a 0. In this case OR gate 74 does not operate to control the setting of the $\bar{S}$ flip-flop in the 1 state with the application of the S pulse. Since no signals need be propagated, the S signal may be applied together with the other three. Thus, at the termination of the second step, in each cell the C flip-flop is in the 1 state and the $\bar{S}$ flip-flop is in the 1 state only if both bits in the cell are 1's. In the third step a 1 is written into flip-flop $X_k$ if flip-flops $X_i$ and $X_j$ both contain 1's. If either flip-flop contains a 0 the $\bar{S}$ flip-flop is in the 0 state while the C flip-flop is in the 1 state and a 0 is written into the $X_k$ flip-flop.

(6) *OR i, j, k.*—Form the logical function $(i)+(j)$ on a cell-by-cell basis and store it in the $X_k$ flip-flops.

(a) $R_c$, $R_{\bar{S}}$
(b) $A_F$, $B_i$, $B_j$—S
(c) $A_k$, $B_k$, W

In the first step the C and $\bar{S}$ flip-flops in each cell are reset in the 0 states. In the second step because of the $A_F$ signal, the $\bar{\alpha}$ signal in each cell is a 0 and has no effect on the cell operation. The $B_i$ and $B_j$ signals cause the $\beta$ function in each cell to be a 1 if at least one of the $X_i$ and $X_j$ flip-flops contains a 1. In such a case the $\bar{\beta}$ signal is a 0, OR gate 74 does not operate and the $\bar{S}$ flip-flop remains in the 0 state with the application of the S pulse. Since both the C and $\bar{S}$ flip-flops are in the 0 state a 1 is written into flip-flop $X_k$ in the third step. Only if both bits are 0's is the $\beta$ signal a 0 and the $\bar{\beta}$ signal a 1. In this case the $\bar{S}$ flip-flop is set in the 1 state during step (b), and since the C and $\bar{S}$ flip-flops are in opposite states, a 0 is written into flip-flop $X_k$ in the third step.

(7) *EXCLUSIVE-OR i, j, k.*—Form the logical function $(i).(\bar{j})+(\bar{i}).(j)$ on a cell-by-cell basis and store it in the $X_k$ flip-flops.

(a) $R_c$, $R_{\bar{S}}$
(b) $A_i$, $A_j$, $B_i$ $B_j$—S
(c) $A_k$, $B_k$, W

In the first step the C and $\bar{S}$ flip-flops in each cell are reset. If flip-flops $X_i$ and $X_j$ are in the same state, the four signals $A_i$, $A_j$, $B_i$ and $B_j$ cause one and only one of gates 72 and 73 to operate. Since one of the $\bar{\alpha}$ or $\bar{\beta}$ signals is a 1, with the application of the S pulse the $\bar{S}$ flip-flop is set in the 1 state. Since the C and $\bar{S}$ flip-flops are in opposite states a 0 is written into flip-flop $X_k$ in the third step. On the other hand, if flip-flops $X_i$ and $X_j$ are in opposite states both of OR gates 72 and 73 operate. Since the $\bar{\alpha}$ and $\bar{\beta}$ signals are both 0's the $\bar{S}$ flip-flop remains in the 0 state. Since the C and $\bar{S}$ flip-flops are both in the 0 state, a 1 is written into flip-flop $X_k$ in step (c). Consequently, it is seen that flip-flop $X_k$ has a 1 written into it only if the original two bits have opposite values, i.e., the exclusive-OR condition is realized.

(8) *NAND i, j, k.*—Form the logical function $(\bar{i}).(\bar{j})$ on a cell-by-cell basis and store it in the $X_k$ flip-flops.

(a) $C_S$, $R_{\bar{S}}$ (b) $A_F$, $B_i$, $B_j$—S (c) $A_k$, $B_k$, W

In the first step the C flip-flop in each cell is set in the 1 state and the $\bar{S}$ flip-flop is reset in the 0 state. The $A_F$ signal in the second step causes the $\bar{\alpha}$ function to be a 0 in each cell and to have no effect on the cell operation. The $B_i$ and $B_j$ signals enable the $\beta$ function to be a 0 only if both of the two original bits are 0's. In this case the $\bar{\beta}$ signal is a 1 and the $\bar{S}$ flip-flop is set in the 1 state. Since the C and $\bar{S}$ flip-flops are both in the 1 state a 1 is written into flip-flop $X_k$ in the third step. This is the desired result since if the two bits in the cell are both 0's, the product of the complemented bits is a 1. On the other hand, if either one or both of the original bits is a 1 the $\beta$ signal is a 1 and the $\bar{S}$ flip-flop remains in the 0 state. Since the C flip-flop is in the 1 state a 0 is written into flip-flop $X_k$ in step (c). This is the desired result because if at least one of the bits is a 1 the final function should be a 0.

(9) *NOR i, j, k.*—Form the logical function $(\bar{i})+(\bar{j})$ on a cell-by-cell basis and store it in the $X_k$ flip-flops.

(a) $R_C$, $R_{\bar{S}}$ (b) $A_i$, $A_j$, $B_F$—S (c) $A_k$, $B_k$, W

In the first step the C and $\bar{S}$ flip-flops in each cell are reset in the 0 state. The $B_F$ signal in the second step forces all $\bar{\beta}$ signals to be 0's and to have no effect on cell operations. The $A_i$ and $A_j$ signals cause the $\alpha$ function to be a 1 if at least one of original bits is a 0. In such a case $\bar{\alpha}$ is a 0 and the $\bar{S}$ flip-flop remains in the 0 state. Since both the C and $\bar{S}$ flip-flops are in the 0 state, a 1 is written into flip-flop $X_k$ in the third step. This is the desired result since the final function must be a 1 if at least one of the original bits is a 0. Only if both of the bits are 1's should the final function be a 0. In such a case the $\alpha$ signal is a 0, the $\bar{\alpha}$ signal is a 1 and the $\bar{S}$ flip-flop is set in the 1 state in step (b). Since the C and $\bar{S}$ flip-flops are in opposite states a 0 is written into flip-flop $X_k$ in the last step.

(10) *EXCLUSIVE-OR-NOT i, j, k.*—Form the logical function $(i)\ (j)+(\bar{i})\ (\bar{j})$ on a cell-by-cell basis and store it in the $X_k$ flip-flops.

(a) $C_S$, $R_{\bar{S}}$ (b) $A_i$, $A_j$, $B_i$, $B_j$—S (c) $A_k$, $B_k$, W

In the first step the C flip-flop in each cell in set in the 1 state and the $\bar{S}$ flip-flop is reset in the 0 state. The four input signals applied in step (b) cause the $\alpha$ and $\beta$ signals to be opposite in value only if the two bits agree. If the two bits agree, one of the $\beta$ and $\alpha$ signals is a 0, one of the $\bar{\alpha}$ and $\bar{\beta}$ signals is a 1 and the $\bar{S}$ flip-flop is set in the 1 state. Since the C and $\bar{S}$ flip-flops are both in the 1 state, a 1 is written into the flip-flop $X_k$ in the third step. This is the desired result because the Exclusive-OR-NOT function should be a 1 when the two data bits are both 0's or both 1's. On the other hand, if the two bits are opposite to one another, both of the $\alpha$ and $\beta$ signals are 1's and OR gate 74 cannot operate. The $\bar{S}$ flip-flop remains in the 0 state and since the C flip-flop is in the 1 state a 0 is written into the $X_k$ flip-flop in step (c).

The ten operations described above are merely illustrative of the many which may be performed in an array utilizing the cells of my invention. These operations may also be combined to execute still other orders. Consider the case of subtraction in which $(i)$ is to be subtracted from $(j)$. The following two operations, each of which requires three steps, control the subtraction.

NAND *i*,—,*k*

ADD and INCREASE *k, j, k*

The number $(i)$ can be subtracted from the number $(j)$ if each bit in $(i)$ is inverted, the inverted number is added to $(j)$ and the sum is increased by one. The NAND operation merely inverts $(i)$ and stores the result in the $X_k$ flip-flops. Since in step (b) the $B_j$ signal is not applied the NAND function reduces to $(\bar{i})$. Once the inverted number is stored in the $X_k$ flip-flops the ADD and INCREASE operation causes the inverted number to be added to $(j)$ and the sum, stored in the $X_k$ flip-flops, to be increased by one. This double operation requires only one carry propagation, that required in the ADD and INCREASE operation, and can therefore control a subtraction operation very rapidly. The sequence is further advantageous in the following respect. If the two numbers $(i)$ and $(j)$ both contain $\underline{n}$ bits the $\underline{n}$ respective cells contain the result in their $X_k$ flip-flops, and the value of the bit stored in the $X_k$ flip-flop in the cell to the left of the $\underline{n}$ cell sequence contains the sign of the result.

The $I_{Ai}$ and $I_{Bi}$ signals applied to each cell can be derived, as explained above, from an external source. If the $I_{Ai}$ signal is high and the $I_{Bi}$ signal is low the external source represents a 0, and if the $I_{Bi}$ signal is high rather than the $I_{Ai}$ signal the external source represents a 1. The cell operates as if the two signals were derived from another data flip-flop. The $A_I$ and $B_I$ input signals control the operations of gates 70 and 71 just as the other A and B signals control the operations of respective gates such as 96 and 97. However, it is possible that the external source may cause the $I_{Ai}$ signal to be high to represent a 1 and the $I_{Bi}$ signal to be high to represent a 0. In such a case the inputs to gates 70 and 71 are opposite to the inputs to the other output gates when the same valued bits are represented. This allows certain operations to be executed even more rapidly. Suppose, for example, that the difference $(X_1)\ -I$ is to be derived and stored in the $X_k$ flip-flops, where I represents the data word whose bits are applied to the $I_A$ and $I_B$ conductors, with the $I_A$ signal in each position being high to represent a 1. In this case the subtraction operation may be performed in only the following three steps, rather than the six steps required as described above.

(a) $R_C$, $R_{\bar{S}}$—$FI_{SP}$, $C_S$ (b) $A_1$, $A_I$, $B_1$, $B_I$—$C_L$,S (c) $A_k$, $B_k$, W It will be seen that these three steps are the same as those used in the ADD and INCREASE operation except that the $A_I$ and $B_I$ conductors are pulsed rather than the $A_j$ and $B_j$ conductors. It will be recalled that to subtract one number from another one of the numbers has each of its bits inverted, the sum is then derived, and the sum is then increased by 1. This is essentially the operation performed in the three steps given above. The basic ADD and INCREASE sequence controls the addition and the increase of the sum by 1. Because the $I_A$ and $I_B$ signals are opposite to those at the output of each data flip-flop in the cell when the same bit is represented, the inversion of the I word is effectively accomplished in step (b) while the $\bar{S}$ flip-flop in each cell is being set in the required state.

Many other operations may be performed in the cells of my invention. Because the cells are numerically oriented, numerical operations may be performed very rapidly. Although the invention has been described with respect to two particular embodiments, it is to be understood that these embodiments are merely illustrative of the application of the principles of the invention. Numerous modifications may be made therein and other arrangements may be devised without departing from the spirit and scope of the invention.

What is claimed is:

1. An associative memory comprising a series of adjacent cells; means for applying control signals simultaneously to all of said cells; and means for applying a plurality of pairs of input data signals simultaneously to all of said cells; each of said cells including a plurality of bistate data registers and a plurality of bistate control devices, means for coupling each pair of said applied data signals to a respective one of said data registers, first detecting means operative in response to said applied data signals and to at least one of a group selected data registers being in a first state, second detecting means operative in response to said applied data signals and to at least one of said group of selected data registers being in a second state, means for controlling the state of a first of said control devices responsive to at least one of said first and second detecting means not operating, means for controlling the state of a second of said control devices in accordance with a signal propagated to the cell from either of the adjacent cells, first means responsive to the operation of said second detecting means and either the nonoperation of said first detecting means or the receipt of a propagation signal from one of the adjacent cells for propagating a signal to the other adjacent cell, second means for propagating a signal to said one adjacent cell responsive to the nonoperation of said first detecting means, and means for controlling directly the states of said first and second control devices in accordance with respective ones of said applied control signals.

2. An associative memory in accordance with claim 1 further including means in each of said cells responsive to first and second applied control signals for operating respectively said first and second detecting means independent of the states of said group of selected data registers and said applied data signals.

3. An associative memory in accordance with claim 2 wherein each of said cells further includes means responsive to the operation of neither of said first and second detecting means for controlling the state of said first control device, and means responsive to the said first and second control devices being in the same state for setting a third control device and selected ones of said data registers in a first state and responsive to said first and second control devices being in opposite states for setting said third control device and said selected data registers in a second state.

4. An associative memory in accordance with claim 3 wherein each of said cells further includes means for enabling the operation of last-mentioned means and the operation of said first signal propagating means dependent upon either said third control device being in one of said two states or the receipt of a predetermined one of said applied control signals.

5. An associative memory comprising a series of adjacent cells; means for applying control signals simultaneously to all of said cells; and means for applying a plurality of pairs of input data signals simultaneously to all of said cells; each of said cells including a plurality of bistate data registers and a plurality of bistate control devices, means for coupling each pair of said applied data signals to a respective one of said data registers, first detecting means operative in response to said applied data signals and to at least one of a group of selected data registers being in a first state, second detecting means operative in response to said applied data signals and to at least one of said group of selected data registers being in a second state, means for controlling the state of a first of said control devices responsive to at least one of said first and second detecting means not operating, means for controlling the state of a second of said control devices in accordance with a signal propagated to the cell from either of the adjacent cells, first means responsive to the operation of said second detecting means and either the nonoperation of said first detecting means or the receipt of a propagation signal from one of the adjacent cells for propagating a signal to the other adjacent cell; second means responsive to the operation of said second detecting means and either the nonoperation of said first detecting means or the receipt of a propagation signal from said other adjacent cell for propagating a signal to said one adjacent cell, and means for controlling directly the states of said first and second control devices in accordance with respective ones of said applied control signals.

6. An associative memory in accordance with claim 5 further including means in each of said cells responsive to first and second applied control signals for operating respectively said first and second detecting means independent of the states of said group of selected data registers and said applied data signals.

7. An associative memory in accordance with claim 6 wherein each of said cells further includes means for setting selected ones of said data registers in a first state if both of said first and second control devices are in the same state and for setting said selected data registers in a second state if said first and second control devices are in different states.

8. An associative memory in accordance with claim 7 wherein each of said cells further includes means responsive to a respective applied signal for enabling the operation of said last-mentioned means and said first and second signal propagating means.

9. An associative memory comprising a series of adjacent cells; and means for applying signal simultaneously to all of said cells; each of said cells including a plurality of bistate data registers and a plurality of bistate control devices, first means operative in response to at least one of a group of selected data registers being in a first state, second means operative in response to at least one of said group of selected data registers being in a second state, means for controlling the state of a first of said control devices responsive to at least one of said first and second means not operating, means for controlling the state of a second of said control devices in accordance with a signal propagated to the cell from an adjacent cell, and means responsive to the operation of said second means and either the nonoperation of said first means or the receipt of a propagation signal from an adjacent cell for propagating a signal to the other adjacent cell.

10. An associative memory in accordance with claim 9 further including means in each of said cells responsive to first and second predetermined applied signals for operating respectively said first and second means independent of the states of said group of selected data registers.

11. An associative memory in accordance with claim 10 wherein each of said cells further includes means responsive to the operation of neither of said first and second means for controlling the state of said first control device, and means responsive to the states of said first and second control devices for controlling the state of a third of said control devices.

12. An associative memory in accordance with claim 11 wherein said last-mentioned means includes means for settting said third control device in a first state if both of said first and second control devices are in the same state and means for setting said third control device in a second state if said first and second control devices are in different states.

13. An associative memory in accordance with claim 12 wherein each of said cells further includes means for controlling the setting of selected ones of said data registers in accordance with the operation of said last-mentioned means.

14. An associative memory in accordance with claim 12 wherein each of said cells further includes means for enabling the operation of said last-mentioned means and said signal propagating means dependent upon either said third control device being in one of said two states or the receipt of a predetermined one of said applied signals.

15. An associative memory in accordance with claim 10 wherein each of said cells further includes means responsive to said first and second control devices being in the same state for setting selected ones of said data registers in a first state and means responsive to said first and second control devices being in opposite states for setting said selected data registers in a second state.

16. An associative memory in accordance with claim 15 wherein each of said cells further includes means responsive to a respective applied signal for enabling the operation of said last-mentioned means and for enabling the operation of said signal propagating means.

17. An associative memory comprising a series of adjacent cells; and means for applying signals simultaneously to all of said cells; each of said cells including a plurality of data registers and a plurality of control devices, first means operative in response to the states of a selected group of data registers, second means operative in response to the states of said selected group of data registers, means for controlling the operation of a first of said control devices in accordance with the operations of said first and second means, means for controlling the operation of a second of said control devices in accordance with a signal propagated to the cell from an adjacent cell, and means responsive to the operations of said first and second means and the receipt of a propagation signal from an adjacent cell for propagating a signal to the other adjacent cell.

18. An associative memory in accordance with claim 17 further including means in each of said cells responsive to predetermined first and second applied signals for operating directly respective ones of said first and second means.

19. An associative memory in accordance with claim 18 wherein each of said cells further includes means responsive to the same operations of said first and second control devices for writing first predetermined data in selected ones of said data registers and means responsive to different operations of said first and second control devices for writing second predetermined data in said selected data registers.

20. An associative memory in accordance with claim 19 wherein each of said cells further includes means for controlling the operation of a third control device in accordance with the operation of said writing means, and means for selectively operating said first and second means in accordance with the operation of said third control device.

21. An associative memory in accordance with claim 20 wherein each of said cells further includes means for enabling the operation of said writing means and said signal propagating means dependent upon either the operation of said third control device or the receipt of a predetermined one of said applied signals.

22. An associative memory in accordance with claim 19 wherein each of said cells further includes means responsive to a respective applied signal for enabling the operation of said writing means and for enabling the operation of said signal propagating means.

23. An associative memory in accordance with claim 18 wherein said signal propagating means includes means for enabling a signal to be propagated only if said second means operates together with either the nonoperation of said first means or the receipt of a propagation signal from the adjacent cell.

24. An associative memory comprising a series of adjacent cells; means for applying control signals simultaneously to all of said cells; and means for applying a plurality of pairs of input data signals simultaneously to all of said cells; each of said cells including a plurality of control flip-flops and a plurality of data flip-flops, each pair of said data signals being associated with a respective one of said data flip-flops, a first circuit operative in response to any one of said data flip-flops being in a first state when a first one of the two associated data signals is received, a second circuit operative in response to any one of said data flip-flops being in a second state when the second one of the two associated data signals is received, means responsive to the operations of said first and second circuits for controlling the state of at least one of said control flip-flops, and means responsive to the operations of said first and second circuits and to the receipt of a propagated signal from an adjacent cell for propagating a signal to the other adjacent cell to control the state of one of the control flip-flops in said other adjacent cell.

25. An associative memory in accordance with claim 24 further including means in each of said cells for controlling directly the operations of said first and second circuits in accordance with respective ones of said applied control signals.

26. An associative memory comprising a series of adjacent cells; means for applying control signals simultaneously to all of said cells; means for applying a plurality of pairs of input data signals simultaneously to all of said cells; each of said cells including a plurality of control flip-flops and a plurality of data flip-flops, each pair of said data signals being associated with a respective one of said data flip-flops, a first circuit operative in response to a first applied data signal in each of said pairs and to the states of the associated data flip-flops, a second circuit operative in response to the second applied data signal in each of said pairs and the states of the associated data flip-flops, means responsive to the operations of said first and second circuits for controlling the state of at least one of said control flip-flops, and means responsive to the operations of said first and second circuits and to the receipt of a propagated signal from an adjacent cell for propagating a signal to the other adjacent cell to control the state of one of the control flip-flops in said other adjacent cell.

27. An associative memory in accordance with claim 26 further including means in each of said cells for controlling directly the operations of said first and second circuits in accordance with respective ones of said applied control signals.

28. A cell for an associative memory comprising a plurality of control devices, a plurality of data registers, a first match circuit operative in response to a match between first predetermined data contained in selected data registers and applied data, a second match circuit operative in response to a match between second predetermined data contained in said selected data registers and applied data, means for extending a signal to another cell in accordance with the operations of said first and second match circuits, and means for controlling the operations of said control devices in accordance with the operations of said first and second match circuits and in accordance with at least one signal extended to the cell from another cell.

29. A cell for an associative memory in accordance with claim 28 further including means for controlling directly the operations of said first and second circuits and said control devices.

30. A cell for an associative memory comprising a plurality of data registers, a first match circuit operative in response to a match between first predetermined data contained in a group of selected data registers and applied data, a second match circuit operative in response to a match between second predetermined data contained in said group of selected data registers and applied data, means for extending a signal to at least one other cell in the memory in accordance with the operations of said first and second match circuits, and means for controlling data storage operations in the data registers in accordance with the operations of said first and second match circuits and in accordance with a signal extended to the cell from at least one other cell.

References Cited

UNITED STATES PATENTS

| | | | |
|---|---|---|---|
| 3,031,650 | 4/1962 | Koerner | 340—174 |
| 3,106,698 | 10/1963 | Unger | 340—172.5 |
| 3,185,965 | 5/1965 | Lee | 340—172.5 |
| 3,284,779 | 11/1966 | Lee et al. | 340—172.5 |
| 3,320,594 | 5/1967 | Davies | 340—172.5 |

ROBERT C. BAILEY, *Primary Examiner.*

R. B. ZACHE, *Assistant Examiner.*